United States Patent
Sumino et al.

[11] Patent Number: 6,033,569
[45] Date of Patent: *Mar. 7, 2000

[54] METHOD OF BIOLOGICALLY REMOVING NITROGEN AND SYSTEM THEREFOR

[75] Inventors: Tatsuo Sumino; Nobuko Hashimoto; Hiroki Nakamura; Kazuhiko Noto; Takako Ogasawara; Masaaki Shirai; Hiroyoshi Emori; Masataka Kasai, all of Tokyo, Japan

[73] Assignee: Hitachi Plant Engineering & Construction Co., Ltd., Tokyo, Japan

[*] Notice: This patent is subject to a terminal disclaimer.

[21] Appl. No.: 09/205,107

[22] Filed: Dec. 3, 1998

Related U.S. Application Data

[63] Continuation of application No. 08/682,019, Jul. 16, 1996, Pat. No. 5,876,603.

[30] Foreign Application Priority Data

| Aug. 10, 1995 | [JP] | Japan | 7-204866 |
| Aug. 10, 1995 | [JP] | Japan | 7-204867 |
| Sep. 11, 1995 | [JP] | Japan | 7-232862 |

[51] Int. Cl.[7] .................................................. C02F 3/30
[52] U.S. Cl. ........................ 210/605; 210/611; 210/616; 210/630; 210/903
[58] Field of Search .................................. 210/605, 611, 210/616, 617, 620, 630, 903

[56] References Cited

U.S. PATENT DOCUMENTS

| 3,824,185 | 7/1974 | Caldwell et al. . | |
| 3,994,802 | 11/1976 | Casey et al. . | |
| 4,279,753 | 7/1981 | Nielson et al. | 210/605 |
| 4,537,682 | 8/1985 | Wong-Chong | 210/611 |
| 4,655,924 | 4/1987 | Meijnen | 210/703 |
| 4,705,633 | 11/1987 | Bogusch | 210/903 |
| 4,720,344 | 1/1988 | Ganczarczyk et al. . | |
| 4,786,413 | 11/1988 | Reimann et al. | 210/616 |
| 4,818,407 | 4/1989 | Bogusch | 210/903 |
| 5,290,451 | 3/1994 | Koster et al. | 210/605 |
| 5,314,542 | 5/1994 | Cassidy et al. | 210/903 |
| 5,344,562 | 9/1994 | Lorenz et al. | 210/903 |

FOREIGN PATENT DOCUMENTS

| A-0-014394 | 8/1980 | European Pat. Off. . |
| A-0-346013 | 12/1989 | European Pat. Off. . |
| A-2-678924 | 1/1993 | France . |
| 31 36 409 | 3/1983 | Germany . |
| A-2-259699 | 3/1993 | United Kingdom . |

OTHER PUBLICATIONS

Water Research, vol. 28, No. 7, Jul. 1994, "Ammonia–Oxidizing Bacteria with Different Sensitivities to (NH4)2S04 In Activated Sludges", Yuichi SUWA et al., pp. 1523–1532.

*Primary Examiner*—Christopher Upton
*Attorney, Agent, or Firm*—Oliff & Berridge, PLC

[57] ABSTRACT

In a method of biologically removing nitrogen and a system therefor according to the present invention, by utilizing the characteristics of AH bacteria as being nitrifying bacteria of nitrous acid type for displaying high activity at the high concentration of ammonium nitrogen and the characteristics of AL bacteria as being nitrifying bacteria of nitrous acid type for displaying high activity at the low concentration of the ammonium nitrogen, in the nitrifying process, operations capable of obtaining the maximum nitrifying speed in accordance with the concentration of the ammonium nitrogen can be performed, and the nitrifying reaction of nitrous acid type for producing nitrous acid as being an intermediate oxide material of the ammonium nitrogen can be performed.

2 Claims, 15 Drawing Sheets

FIG. 18

| No. | CONCENTRATION OF WASTE WATER NH₄-N (mg/ℓ) | CONCENTRATION OF NH₄-N FLOWING INTO NITRIFYING TANK (mg/ℓ) | CONCENTRATION OF NH₄-N IN NITRIFYING TANK (mg/ℓ) | RESIDENCE TIME (h) | NITRIFYING SPEED (mg-N/h·ℓ-MEDIUM) |
|---|---|---|---|---|---|
| 1 | 80 | 240 | 160 ± 12 | 1 | 400 |
| 2 | 400 | 600 | 200 ± 20 | 5 | 400 |
| 3 | 1,000 | 1,000 | 450 ± 22 | 6 | 460 |
| COMPARATIVE EXAMPLE | 80 | 80 | 40 ± 5 | 2 | 120 |

FIG. 19

| TIME | CONCENTRATION OF WASTE WATER NH$_4$-N (mg/ℓ) | CONCENTRATION OF NH$_4$-N FLOWING INTO NITRIFYING TANK (mg/ℓ) | CONCENTRATION OF NH$_4$-N IN NITRIFYING TANK (mg/ℓ) | RESIDENCE TIME (h) | NITRIFYING SPEED (mg-N/h·ℓ-MEDIUM) |
|---|---|---|---|---|---|
| EMBODIMENT | 80 | 400 | 170 ± 20 | 4 | 290 |
| COMPARATIVE EXAMPLE | 80 | 80 | 26 ± 10 | 20 | 14 |

METHOD OF BIOLOGICALLY REMOVING NITROGEN AND SYSTEM THEREFOR

This is a Continuation of application Ser. No. 08/682,019 filed Jul. 16, 1996, now U.S. Pat. No. 5,876,603. The entire disclosure of the prior application is hereby incorporated by reference herein in its entirety.

BACKGROUND OF THE INVENTION

1. Field of the Invention

This invention relates to a method of biologically removing nitrogen and a system therefor, and more particularly to a system for biologically removing nitrogen, in which waste water containing ammonium nitrogen at high concentration is nitrified and denitrified by use of fixed microorganisms, whereby nitrogen contained in the waste water is removed.

2. Description of the Related Art

Since ammonium nitrogen contained in the waste water becomes one of the materials causing decrease of dissolved oxygen in a water area for public use, into which effluent flows in and also causing eutrophy in a closed water area, it is necessary to remove ammonium nitrogen in the waste water.

As a method of biologically removing ammonium nitrogen in the waste water, normally, there is a process by use of a single sludge predenitrification process, in which there are utilized nitrifying reaction from ammonia to nitric acid by use of nitrifying bacteria and denitrifying reaction from nitric acid to nitrogen by use of denitrifying bacteria. According to this method, two tanks including a denitrifying tank in the anaerobic condition and a nitrifying tank in the aerobic condition are used, in the nitrifying tank, decomposition of the organic substance and the denitrifying process are performed by the denitrifying bacteria, and, in the nitrifying tank, ammonium nitrogen in the waste water is nitrified into nitric acid by the nitrifying bacteria. Then, a nitrified liquid which is nitrified in the nitrifying tank is recycled through the denitrifying tank, whereby a nitrogen component in the waste water is discharged into condition as nitrogen gas and removed. In this single sludge predenitrification process, in order to improve the nitrifying efficiency, fixing of the nitrifying bacteria is examined, and a process, in which the fixed nitrifying bacteria are thrown into the nitrifying tank is used in practice. Further, a process, in which the fixed denitrifying bacteria are thrown into the denitrifying tank, is examined.

The waste water, to which this single sludge predenitrification process is applied, is chiefly sewerage having the ammonium nitrogen concentration ($NH_4$—N) as low as about 20~60 mg/l, and, in the ammonium nitrogen concentration as low as this extent, nitrifying reaction proceeds smoothly, whereby the ammonium nitrogen concentration in the effluent is decreased to several mg/l less than the effluent standard in the river area.

However, in the case where the waste water containing high ammonium nitrogen concentration (approximately, 400 mg/l~5000 mg/l) is produced in great quantity such for example as in a developing laboratory, an inorganic matter synthesizing factory, a power plant and the like, the ammonium nitrogen concentration of the original waste water is diluted to less than 200 mg/l, and then, the biological process is performed. As the result, such a problem occurs that the amount of the waste water to be processed is increased considerably, whereby a large-sized system for biologically removing nitrogen is needed, however, it is difficult to install the large-sized system in the cities where any large installation area cannot be obtained.

As a method of biologically processing the ammonium nitrogen waste water having the high concentration, the inventors of the invention of the present application have previously developed a method of processing at high speed by a multiple stage process by use of microorganisms entrapped in organic gel. According to this method, the waste water is caused to flow in series through three nitrifying tanks (aeration tanks), into which media of microorganisms entrapped in organic gel are thrown. For example, in the case where operating conditions are selected such that the ammonium nitrogen concentration of the waste water (the ammonium nitrogen concentration of the waste water, which was caused to flow into a first thank) was 250 mg/l, the amount of the processed waste water was 480 $m^3$/day and the residence time was 7 hours, the quality of the processed water in a third tank was decreased to a value as low as 37.5 mg/l. Furthermore, since the nitrifying speed of media in the first tank has shown a very high value of 123 mg-N/h·l-medium, this fact was highly noted as one which made the system to be compact in size. This nitrifying speed is an important factor highly influencing on the rate of removal of nitrogen for determining a required capacity of an aeration thank. The higher the nitrifying speed is, the more the system can be made compact in size.

As described above, necessity has been voiced for making the system for biologically removing nitrogen to be compact in size. In particular, when the system for biologically removing nitrogen for processing the ammonium nitrogen waste water having the high concentration can be made to be compact in size, the usefulness is very high.

However, in the above-described case of multiple stage process, when the waste water, in which the ammonium nitrogen concentration is as high as several thousand mg/l, there is such a problem that the dilution magnification is still required to be increased, and it is still unsatisfactory for making the system to be compact in size.

Because of this, necessity has been voiced for the development of a system for biologically removing nitrogen capable of highly processing, in which the ammonium nitrogen waste water having the high concentration can be processed as it is not diluted or at a concentration of a low dilution magnification.

Now, as for the nitrifying and denitrifying processes, such a concept is generalized that in the nitrifying process, the ammonium nitrogen is oxidized into nitrous acid by bacteria which are generally called Nitrosomonas, then, oxidized into nitric acid by Nitrobactor, and subsequently, reduced into nitrogen gas in the denitrifying process. However, if, at the stage of nitrous acid which is an intermediate oxide material in the nitrifying process, nitrous acid is moved to denitrifying process, i.e., nitrifying and denitrifying reactions of nitrous acid type can be carried out, then, the reaction process can be shortened and the processing time can be decreased according, so that this fact contributes to making the system compact in size, and moreover, it is expected to raise the reacting speed.

SUMMARY OF THE INVENTION

The present invention has been developed to obviate the above-described disadvantages and has as its object the provision of realizing a method of biologically removing nitrogen and a system therefor, in which the system for removing nitrogen from the waste water of ammonium nitrogen is made highly compact in size.

The inventors of the present invention have found that both AH bacteria and AL bacteria are ones for oxidizing ammonium nitrogen into nitrous acid, under the conditions where these AH bacteria and AL bacteria preferentially grow, the rate of nitrous acid is high in the whole nitric oxide materials (the total of nitrous acid and nitric acid) produced by oxidation of the ammonium nitrogen, and further, when liquid containing high nitrous acid is denitrified, nitrous acid-reducing bacteria, which are denitrifying bacteria of the type of denitrifying nitrous acid, grow preferentially, and have developed the invention on these knowledge.

As an example, in the liquid containing the ammonium nitrogen, which has flowed into an effluent portion, such a nitrifying process is performed that the rate of nitrous acid as being an intermediate oxide material is higher than that of nitric acid as being the final oxide with said liquid contacting under the aerobic condition in a reaction portion containing media, in which AH bacteria have grown preferentially. Further, the nitrified liquid, in which the rate of nitrous acid is higher, is put under reaction in the reaction portion containing the denitrifying bacteria, whereby the denitrifying bacteria of the type of denitrifying nitrous acid grow preferentially, so that nitrous acid can be reduced into nitrogen gas and removed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 18 is a view showing the operating conditions and the result in an embodiment, in which the first form of the system for biologically removing nitrogen with the device for thickening the ammonium nitrogen according to the present invention is used, and FIG. 19 is a view showing the operating conditions and the result in an embodiment, in which the first form of the system for biologically removing nitrogen with the device for thickening the ammonium nitrogen according to the present invention is used.

DETAILED DESCRIPTION OF THE PREFERRED EMBODIMENTS

The present invention is developed on the basis of the knowledge of that AH bacteria and AL bacteria, which will be described hereunder, are included in the types of the nitrifying bacteria. Firstly, AH bacteria and AL bacteria, which are needed for understanding the present invention, will be described before describing a system for processing waste water according to the present invention.

That is, when media carrying nitrifying bacteria were thrown into three tanks and three stage process, in which ammonium nitrogen waste water was caused to flow through three tanks in order to achieve an object of speedifying the nitrifying process to a high speed, the inventors of the present invention were able to obtain a nitrifying speed as high as 123 mg-N/h·l-medium. Then, in order to find the cause of this fact, the inventors of the present invention have purified the nitrifying bacteria contained in the media and examined the characteristics of the bacteria. As the result, the inventors of the present invention have broadly divided the bacteria generally called nitrifying bacteria and found that there are living the nitrifying bacteria (AH bacteria) displaying high activity in the high concentration ammonium nitrogen condition and the nitrifying bacteria (AL bacteria) displaying high activity in the low concentration ammonium nitrogen condition. The both AH bacteria and AL bacteria are the bacteria for oxidizing the ammonium nitrogen into nitrous acid as being an intermediate oxide material.

Then, the inventors of the present invention have tried to specify these two types of the nitrifying bacteria, specified the nitrifying bacteria detected after being cultured for eight weeks in ammonium sulfate liquid having the high concentration of 5000 mg/l as AH bacteria, and specified the nitrifying bacteria detected after being cultured for eight weeks in ammonium sulfate having the low concentration of 100 mg/l as AL bacteria.

Figure 1:
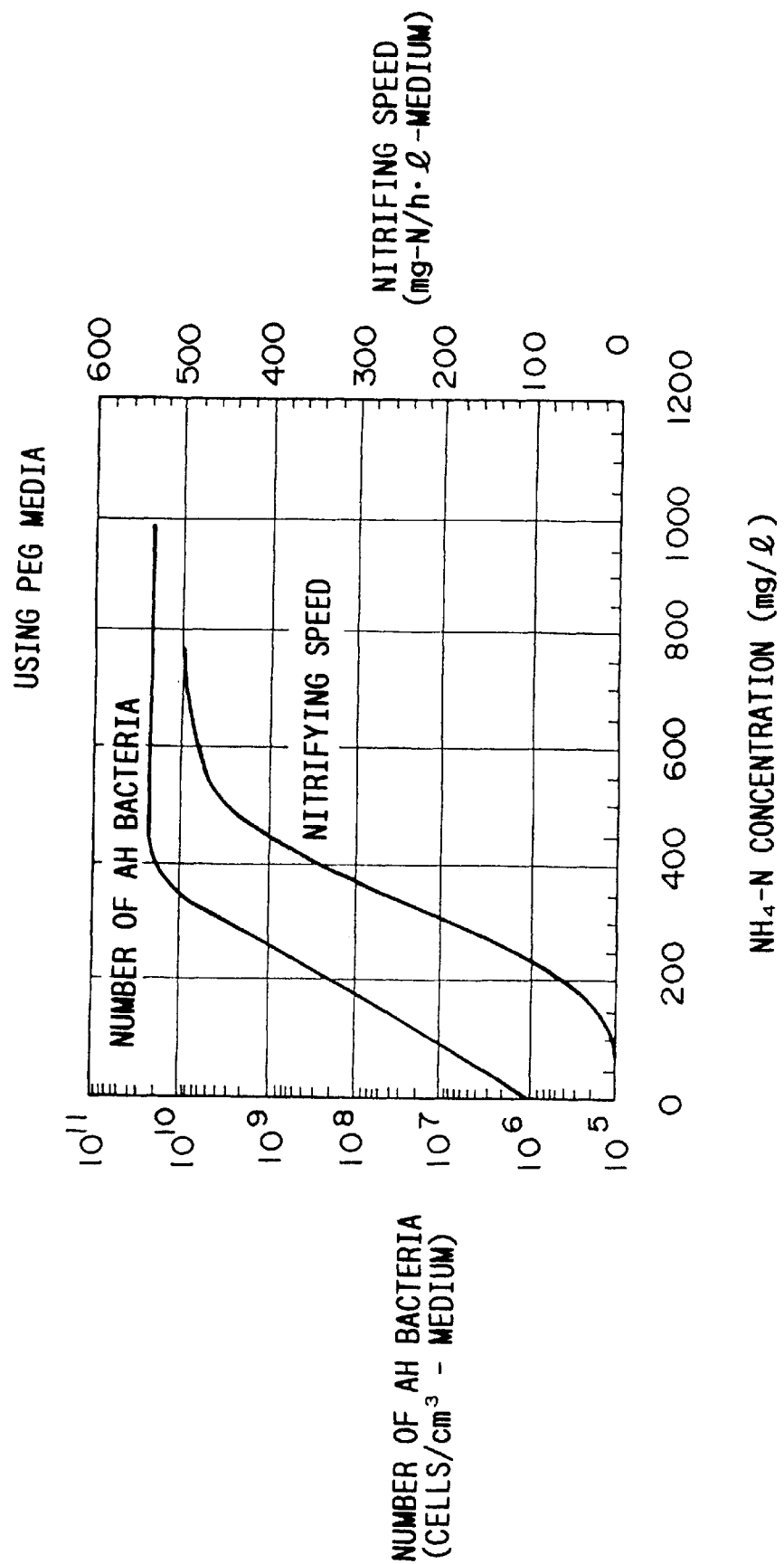
FIG. 1 is a drawing showing the relationship between the nitrifying speed and the number of AH bacteria against the ammonium nitrogen concentration.
Figure 2:
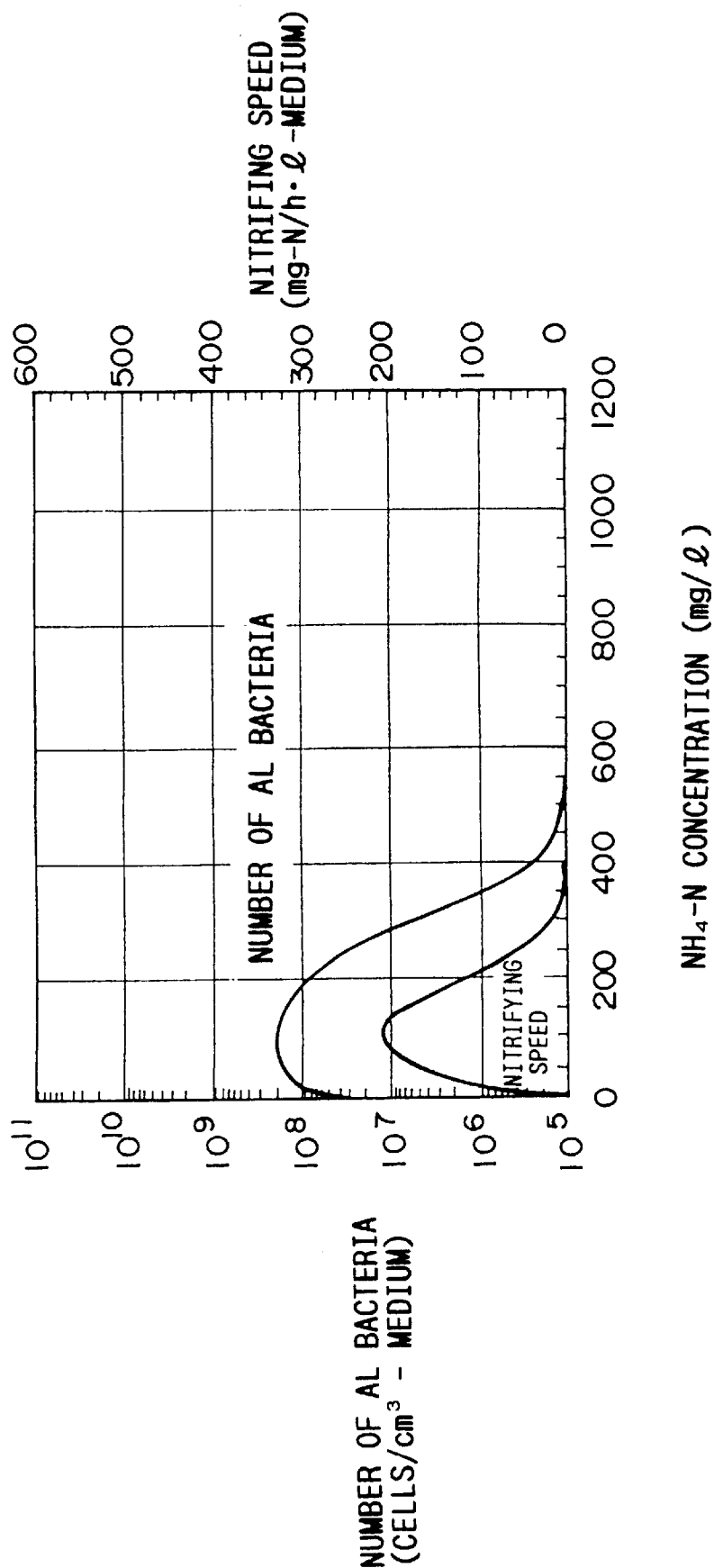
FIG. 2 is a drawing showing the relationship between the nitrifying speed and the number of AL bacteria against the ammonium nitrogen concentration.

In order to search the characteristics of AH bacteria and AL bacteria, which are thus specified, the nitrifying speed of the media and the density of the bacteria which are alive in the media when AH bacteria and AL bacteria are cultured while the ammonium nitrogen concentration is changed are measured in detail, and the relationships shown in FIGS. 1 and 2 have been obtained.

FIG. 1 shows the number of bacteria and nitrifying speed of AH bacteria for the ammonium nitrogen concentration, and FIG. 2 shows the number of bacteria and the nitrifying speed of AL bacteria for the ammonium nitrogen concentration. The nitrifying speed is an important factor for determining the required capacity of the nitrifying tanks and for influencing on the rate of removing nitrogen, and the higher the nitrifying speed is, the more the system can be made compact in size.

As known from FIG. 1, AH bacteria have the number of bacteria and the nitrifying speed are low when the ammonium nitrogen concentration is 200 mg/l or less. However, when the ammonium nitrogen concentration is 400 mg/l or more, the number of bacteria is increased to a number in double figures and the nitrifying speed per medium is increased 300 mg-N/h·l-medium to a value more than three times of that at the time of the low concentration.

As known from FIG. 2, AL bacteria have the high number of bacteria when the ammonium nitrogen concentration is 200 mg/l or less, with the peak of the nitrifying speed being near 100 mg/l. Then, in the region of less than 100 mg/l, the rate of diffusion of ammonia controls nitrifing speed within the rate-determining step, with the apparent nitrifying speed being decreased. Furthermore, the nitrifying speed is decreased in the region of 100 mg/l or more. It is presumable that this is caused by the bacteria are poisoned by ammonia.

Figure 3:
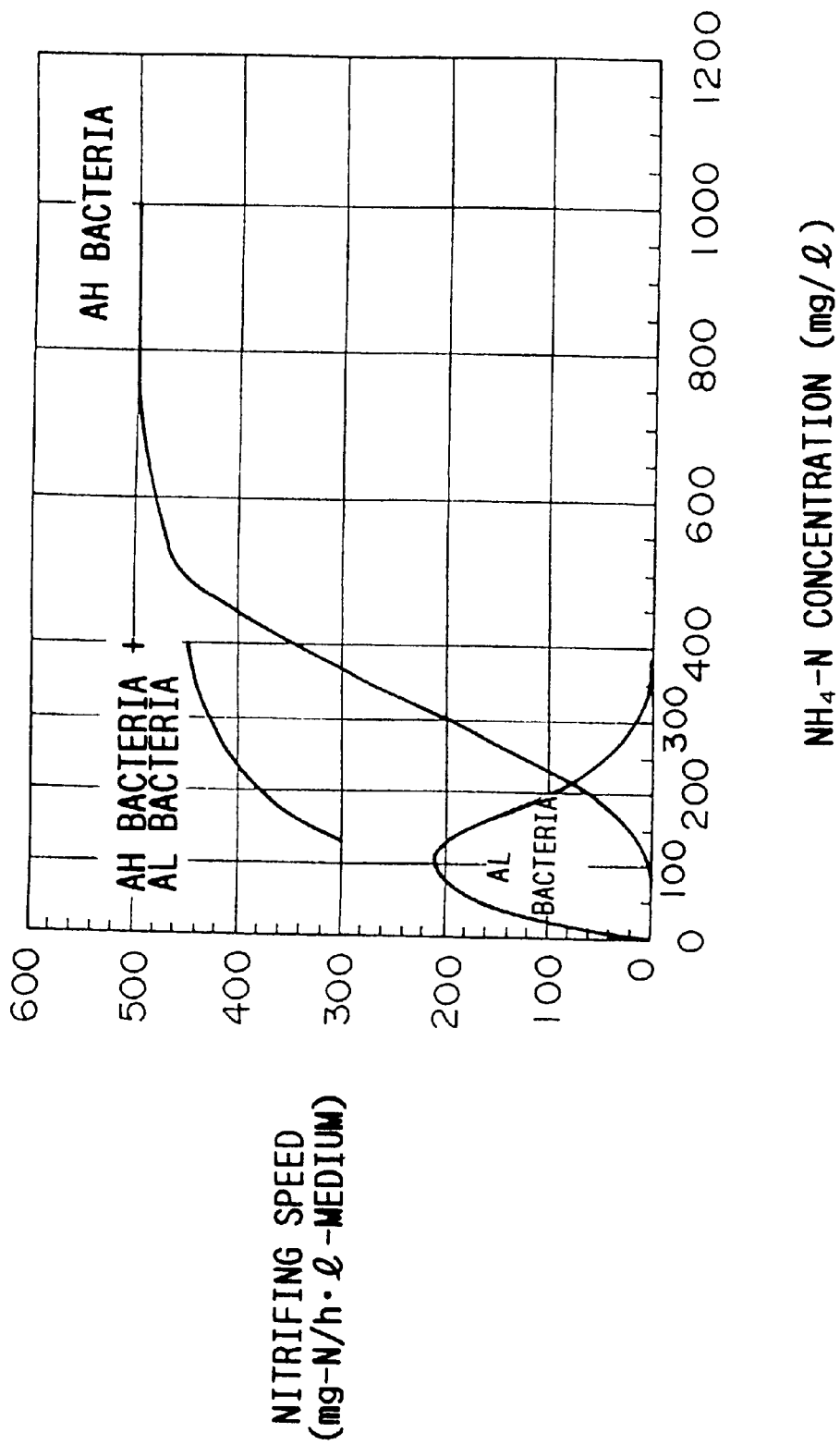
FIG. 3 is a drawing showing the relationship between the nitrifying speeds of AH bacteria and AL bacteria against the ammonium nitrogen concentration.

FIG. 3 shows the nitrifying speed when nitrifying bacteria are cultured within the range of 150~400 mg/l, with the mixing growth between AH bacteria and AL bacteria being recognized. During this time, the nitrifying speed reaches a value as high as 300~450 mg-N/h·l-medium, with the combined effect due to the mixing of the two types of bacteria being recognized.

Figure 4:
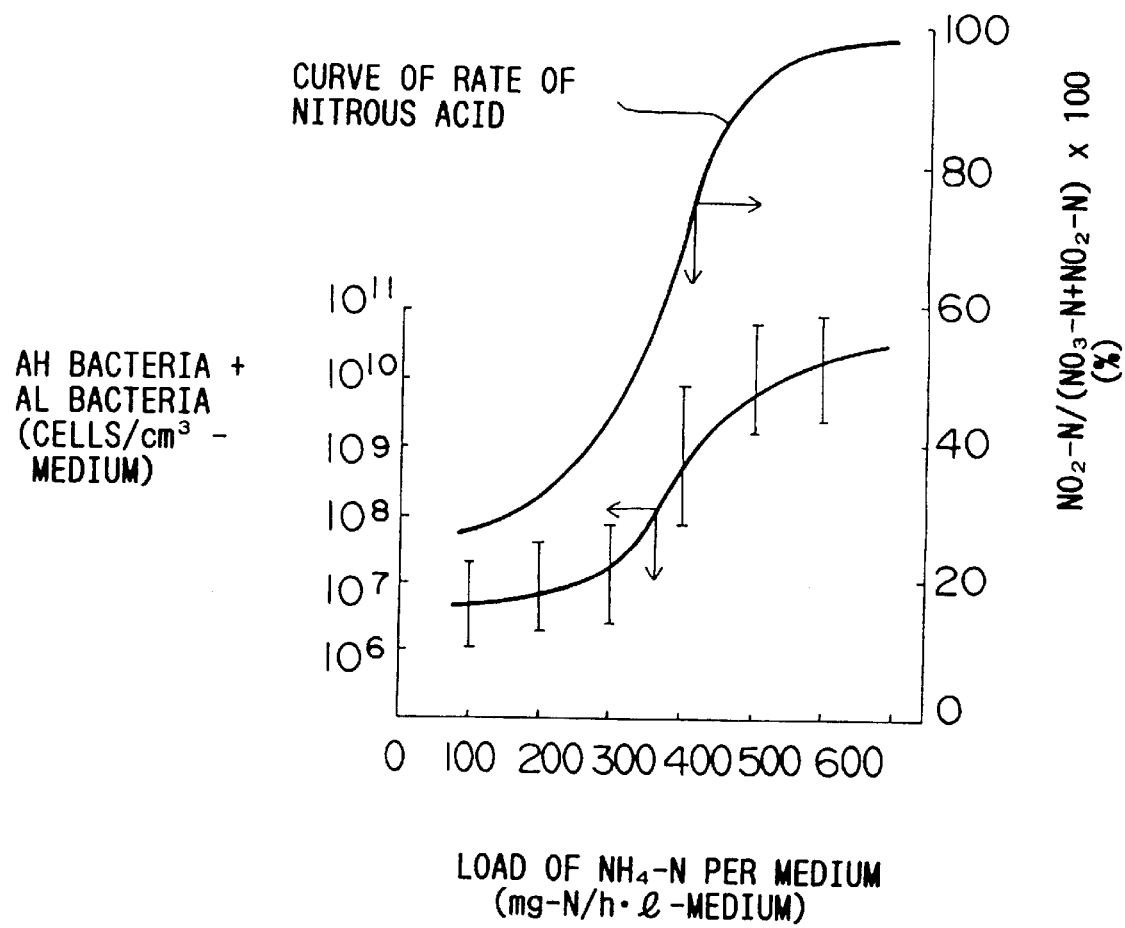
FIG. 4 is a drawing showing the relationship between the number of bacteria and the rate of nitrous acid out of the whole nitric oxide materials as being products of reaction of nitrifying reaction when the ammonium nitrogen load per medium is changed between 100~600 mg-N/h·l-medium while the ammonium nitrogen concentration is kept at 200 mg/l.
Figure 5:
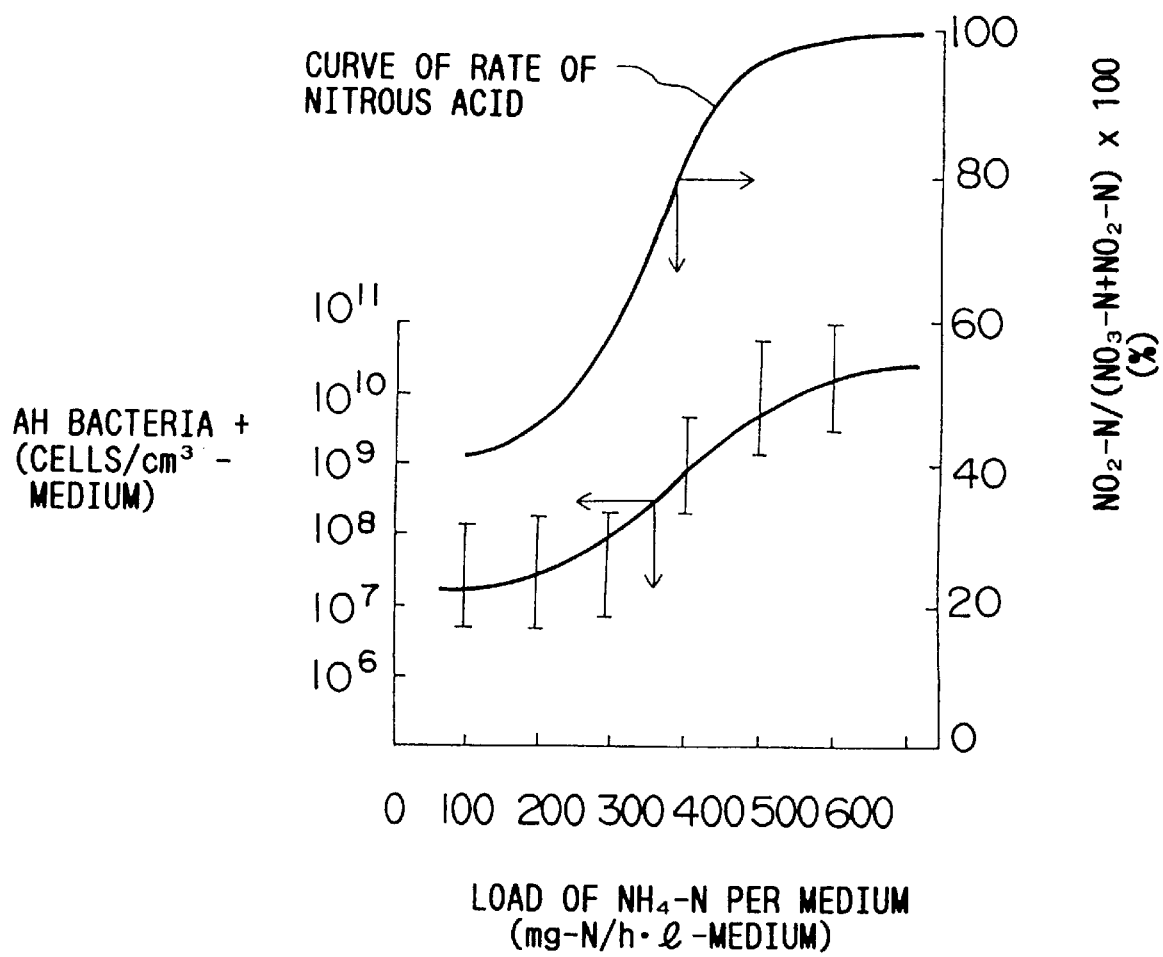
FIG. 5 is a drawing showing the relationship between the number of bacteria and the rate of nitrous acid out of the whole nitric oxide materials when the ammonium nitrogen load per medium is changed between 100~600 mg-N/h·l-medium while the ammonium nitrogen concentration is kept at 500 mg/l.

Furthermore, since the load conditions of the ammonium nitrogen per medium are important for the conditions of culturing and maintaining the bacteria, the characteristics of AH bacteria and AL bacteria are searched under the coexistence with the nitrous acid oxidizing bacteria as being the nitrifying bacteria for oxidizing nitrous acid into nitric acid as being the finial oxide while changing the load conditions of the ammonia nitrogen under the conditions where the ammonium nitrogen concentration is maintained at a predetermined level. FIG. 4 shows the number of bacteria and the rate of nitrous acid out of the whole nitric oxide materials (the total of nitrous acid and nitric acid) as being the reaction product of the nitrifying reaction when the load of ammonium nitrogen per medium is changed between 100~600 mg-N/h·l-medium while the ammonium nitrogen concentration is maintained at 200 mg/l. FIG. 5 shows the number of bacteria and the rate of nitrous acid out of the whole nitric oxide materials when the load of ammonium nitrogen per medium is changed between 100~600 mg-N/h·l-medium while the ammonium nitrogen concentration is maintained at 500 mg/l.

As known from FIG. 4, when the culture was performed at the ammonium nitrogen concentration of 200 mg/l, a mixed biota which were consisted of AH bacteria, AL bacteria and the nitrous acid oxidizing bacteria was observed. It has been found that, when the load of ammonium nitrogen per medium is 300 mg-N/h·l-medium or less, the number of bacteria is as low as $10^7$, however, when the load of ammonium nitrogen per medium is increased, the number of bacteria is increased remarkably, when the load of ammonium nitrogen per medium is 400 mg-N/h·l-medium or more, the number of bacteria can be maintained at $10^8$ or more, and, when the load of ammonium nitrogen per medium is 500 mg-N/h·l-medium or more, the number of bacteria can be maintained at $10^9$ or more. On the other hand, it has been found that, when the load of ammonium nitrogen per medium is increased, the rate of nitrous acid out of the whole nitric oxide materials is increased in parallel to the remarkable increase of the number of bacteria, and, when the load of ammonium nitrogen per medium is made to be 500 mg-N/h·l-medium or more, the rate of nitrous acid becomes about 100%.

Furthermore, as known from FIG. 5, when culture was performed at the ammonium nitrogen concentration of 500 mg/l, a single biota containing only AH bacteria was resulted. Then, the number of bacteria, the rate of nitrous acid out of the whole nitric oxide materials and the load of ammonium nitrogen per medium are increased, the number of bacteria is remarkably increased and the rate of nitrous acid is also remarkably increased, so that the result similar to the case of FIG. 4 can be obtained.

Accordingly, it has been found from FIGS. 4 and 5 that, despite of either the mixed biota between AH bacteria, AL bacteria and the nitrous acid oxidizing bacteria or the mixed biota between AH bacteria and the nitrous acid oxidizing bacteria, AH bacteria and AL bacteria grow preferentially and the density of bacteria is increased by increasing the load of ammonium nitrogen per medium, with the result that the nitrifying speed per medium is increased. Furthermore, by increasing the load of ammonium nitrogen per medium, AH bacteria and AL bacteria, which are the nitrifying bacteria for oxidizing the ammonium nitrogen into nitrous acid, grow preferentially, whereby AH bacteria and AL bacteria govern the nitrifying reaction, so that the nitrifying reaction of nitrous acid type can take precedence.

In the case of immobilized pellets "activated sludge entrapped in organic gel" by increasing the load of ammonium nitrogen per medium, the ammonium nitrogen, which is a nourishment source, can be supplied satisfactorily to the inside of the fixed media, whereby this leads to the increase of the number of bacteria, the increase of the nitrifying speed per medium and further, the preference of the nitrifying reaction of nitrous acid type.

From the above-described examination the following can be said about AH bacteria and AL bacteria.

(1) The bacteria generally called the nitrifying bacteria as being ammonia oxidizing bacteria can be broadly divided into AH bacteria displaying high activity under the conditions of ammonium nitrogen having the high concentration and AL bacteria displaying high activity under the conditions of ammonium nitrogen having the low concentration. These bacteria are nitrifying bacteria for oxidizing ammonium nitrogen into nitrous acid.

(2) AH bacteria preferentially grow in the region of ammonium nitrogen concentration of 400 mg/l or more, the number of bacteria is increased remarkably, the nitrifying speed is raised remarkably, and at the same time, reaction of nitrous acid type is performed in the presence of the nitrous acid oxidizing bacteria. However, in the region where the ammonium nitrogen concentration is low, the nitrifying capacity nearly disappears. This seems to be the characteristics of AH bacteria which have the activity under the high concentration, but have no activity under the low concentration.

(3) AL bacteria preferentially grow in the region of the ammonium nitrogen concentration of 200 mg/l or less, the number of bacteria is increased remarkably, and the nitrifying speed shows a parabola having the peak at about 100 mg/l.

(4) In the region where the ammonium nitrogen concentration is 150~400 mg/l, AH bacteria and AL bacteria grow mixedly, the nitrifying speed has a combined effect due to the mixing of the two types of bacteria (Refer to FIG. 3), and at the same time, the reaction of nitrous acid type is performed in the presence of the nitrous acid oxidizing bacteria.

(5) Despite of either the mixed biota between AH bacteria, AL bacteria and the nitrous acid oxidizing bacteria or the mixed biota between AH bacteria and the nitrous acid oxidizing bacteria, by increasing the load of ammonium nitrogen per medium, All bacteria and AL bacteria preferentially grow and the numbers of bacteria are increased, with the result that the nitrifying speed per medium is increased, and at the same time, AH bacteria and AL bacteria, which are the bacteria for oxidizing the ammonium nitrogen into nitrous acid, grow preferentially, whereby AH bacteria and AL bacteria govern the nitrifying reaction, so that the nitrifying reaction of nitrous acid type take precedence.

When the above-described know ledges (1) to (5) are combinedly examined, by bringing liquid containing ammonia, in which the ammonium nitrogen concentration is 400 mg/l or more in the liquid, into contact with the fixed media, in which AH bacteria as being the nitrifying bacteria grow preferentially, in the aerobic condition, the ammoniac waste water having the high concentration is processed in the state of being at high concentration, and the nitrifying reaction of nitrous acid type, which produces nitrous acid as being an intermediate oxide of the ammonium nitrogen, can be carried out. By carrying out the nitrifying reaction of nitrous acid type, the loading of addition of organic substance required for the denitrifying process can be decreased as compared with the case where the conventional nitrifying reaction of nitric acid type is carried out. In this case, when it is tried to make the load of ammonium nitrogen per medium of the fixed media, in which the aforesaid AH bacteria grow preferentially, to be 500 mg-N/h·l-medium or more, preferably 600 mg-N/h·l-medium or more, the nitrifying speed is further raised, more speedified process can be performed, and at the same time, the nitrifying reaction of nitrous acid type can govern. When the air is strongly aerated to the waste water, the ammonia in the ammoniac waste water having the high concentration is released in the air. As a result, the ammonia decreases slightly. In this case, however, there is a secondary problem.

Accordingly, in order to biologically remove the ammonia in the ammoniac waste water having the high concentration, the desirable decrease of the ammoniac nitrogen is less than 800 mg/l per process.

Furthermore, by bringing liquid containing ammonia, in which the ammonium nitrogen concentration is 100~400 mg/l or more in the liquid, into contact with the fixed media, in which AH bacteria and AL bacteria, which are the nitrifying bacteria grow mixedly, in the aerobic condition, the ammoniac waste water ranging from the medium concentration to the low concentration can be processed at high speed, and the nitrifying reaction of nitrous acid type for producing nitrous acid as being an intermediate oxide material of the ammonium nitrogen can be carried out. Then, by carrying out the nitrifying reaction of nitrous acid type, the loading of addition of organic substance required for the denitrifying process can be decreased as compared with the case where the conventional nitrifying reaction of nitric acid type. In this case too, when it is tried to make the ammonium nitrogen per medium of the fixed media, in which the aforesaid AH bacteria and AL bacteria are mixed and fixed, to be 500 mg-N/h·l-medium or more, preferably 600 mg-N/h·l-medium or more, the nitrifying speed is further raised, more speedified process can be performed, and at the same time, the nitrifying reaction of nitrous acid type can govern.

Accordingly, by skillfully utilizing the characteristics of AH bacteria suitable for the waste water of ammonium nitrogen having the high concentration and the characteristics of AH bacteria plus AL bacteria, in which AH bacteria and AL bacteria, which are suitable for the waste water of ammonium nitrogen having the medium concentration, grow mixedly, the waste waters including the waste water of ammonium nitrogen having the high concentration at a developing laboratory, an inorganic matter synthesizing factory, a power plant and the like and the waste water of ammonium nitrogen having the low concentration in a sewerage and the like can be processed efficiently and at high speed, and at the same time, the nitrifying reaction of nitrous acid type can be carried out, so that the system for biologically removing nitrogen can be made compact in size greatly.

FIGS. 6 to 14 are examples of arrangement of the system for biologically removing nitrogen according to the present invention, which are constructed on the basis of the above-described knowledges.

Figure 6:
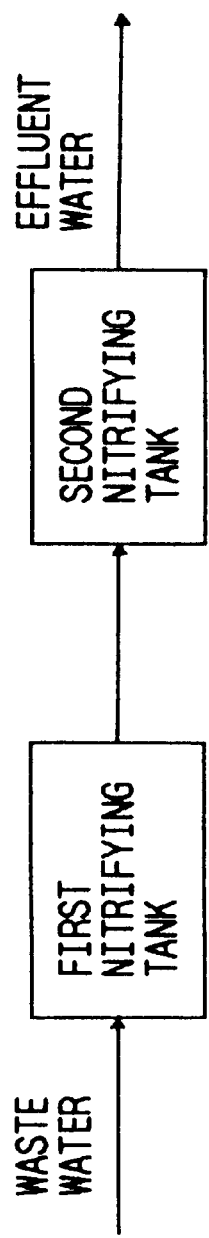
FIG. 6 is a block diagram, in which nitrifying tanks are provided at two stages in series in the system of biologically removing nitrogen according to the present invention.
Figure 7:
FIG. 7 is a block diagram, in which nitrifying tanks are provided at three stages in series in the system for biologically removing nitrogen according to the present invention.
Figure 8:
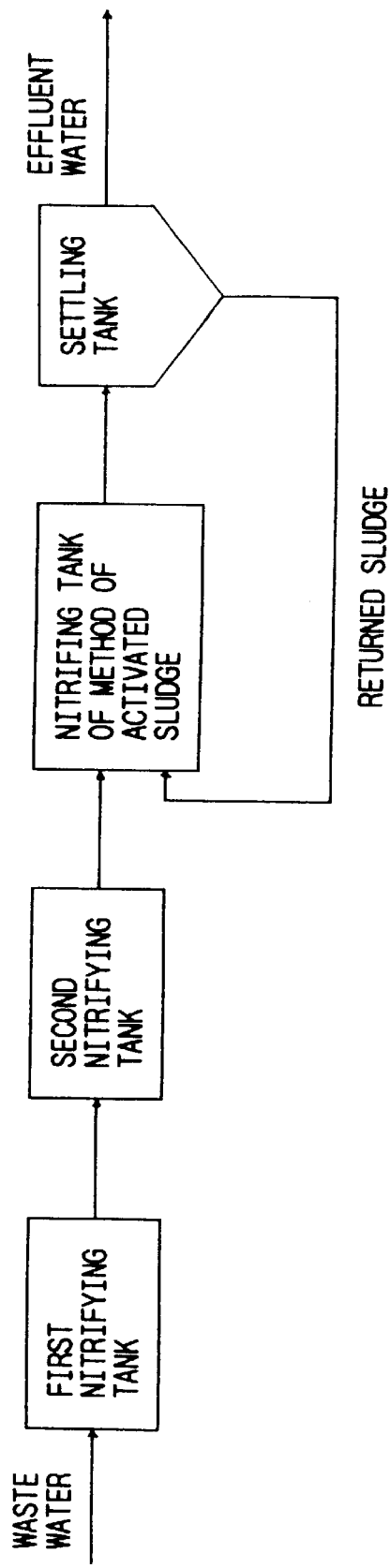
FIG. 8 is a block diagram, in which nitrifying tanks are provided at three stages in series and the third stage is made to be an activated sludge tank in the system for biologically removing nitrogen according to the present invention.

FIGS. 6 to 8 show the cases where the nitrifying tanks are provided at multiple stages.

FIG. 6 shows the two stage process in which the waste water of ammonium nitrogen is caused to flow through two nitrifying tanks in series, and FIG. 7 is the example of three stage process, in which the waste water of ammonium nitrogen is caused to flow through three nitrifying tanks in series. Furthermore, FIG. 8 is the example, in which the nitrifying tank of activated sludge method and the settling tank is provided in place of the nitrifying tank at the third stage shown in FIG. 7. In these respective nitrifying tanks, there are used fixed media, in which AH bacteria preferentially grow in accordance with the concentration of the ammonium nitrogen which flows into the respective nitrifying tanks, fixed media, in which AH bacteria and AL bacteria grow mixedly and fixed media, in which AL bacteria grow preferentially.

With this arrangement, in the respective nitrifying tanks, there are performed operations capable of obtaining the maximum nitrifying speed in accordance with the ammonium nitrogen concentration, so that the nitrifying reaction can be carried out efficiently, the ammonium nitrogen concentration can be effectively decreased and the process at high speed can be performed.

Figure 9:
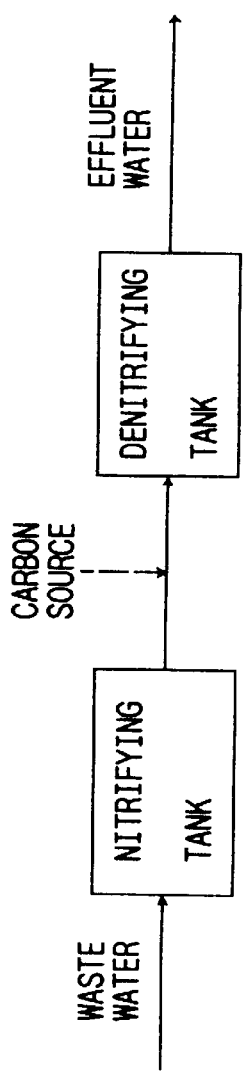
FIG. 9 is a block diagram, in which the system for biologically removing nitrogen according to the present invention consist of nitrifying and denitrifying.

Furthermore, FIGS. 9 to 14 are the examples in the case of consisting of the nitrifying tank or tanks and the denitrifying tank or tanks. FIG. 9 shows the case where the system consists of the nitrifying tank and the denitrifying tank, and the waste water is caused to flow through the nitrifying tank and the denitrifying tank in series, in which, as for the fixed media which are thrown into the nitrifying tank, in the case where the ammonium nitrogen concentration of the waste water is high, fixed media, in which AH bacteria grow preferentially are thrown, and in the case where the ammonium nitrogen concentration is from medium to low, the fixed media, into which AH bacteria and AL bacteria grow mixedly, are thrown. Furthermore, the floating type activated sludge containing the denitrifying bacteria or the fixed media of the denitrifying bacteria are thrown into the denitrifying tank, and a carbon source such as methanol as being a hydrogen donor source for the denitrifying bacteria is added to a nitrified liquid which is caused to flow from the nitrifying tank to the denitrifying tank. The reason why the carbon source is added to the denitrifying tank resides in that, when the waste water is caused to flow from the nitrifying tank to the denitrifying tank, the organic substance contained in the waste water (which is the hydrogen donor source for the denitrifying bacteria) is also oxidized and decreased, so that the hydrogen donor source is required to be added to the nitrified liquid. However, from the viewpoint of economics, it is desirable to decrease the loading of addition as much as possible. Instead of adding the carbon source such as methanol as being the hydrogen donor source, a bypass line from the original waste water to the denitrifying tank may be provided to supply part of the organic substance contained in the waste water to the denitrifying tank.

Figure 10:
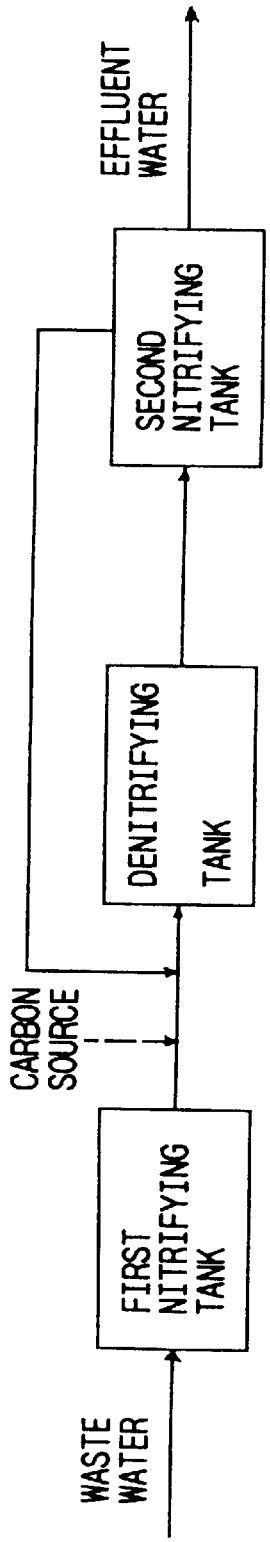
FIG. 10 is a block diagram, in which the system for biologically removing nitrogen according to the present invention consists of nitrifying, denitrifying and nitrifying.

FIG. 10 shows the arrangement, in the case where the second nitrifying tank is further provided at the latter stage of the denitrifying tank shown in the arrangement of FIG. 9 and the nitrified liquid from the second nitrifying tank is recycled through the denitrifying tank. In this arrangement, as the fixed media, which are thrown into the nitrifying tank, in the case where the ammonium nitrogen concentration of the waste water is high, the fixed media, in which AH bacteria grow preferentially in the first nitrifying tank, are thrown into the first nitrifying tank, and fixed media, in which AH bacteria and AL bacteria grow mixedly, are thrown into the second nitrifying tank. Furthermore, when the ammonium nitrogen concentration is from medium to low, fixed media, in which AH bacteria and AL bacteria grow mixedly, are thrown into the first nitrifying tank, and fixed media, in which AL bacteria grow preferentially, are thrown into the second nitrifying tank.

Figure 11:
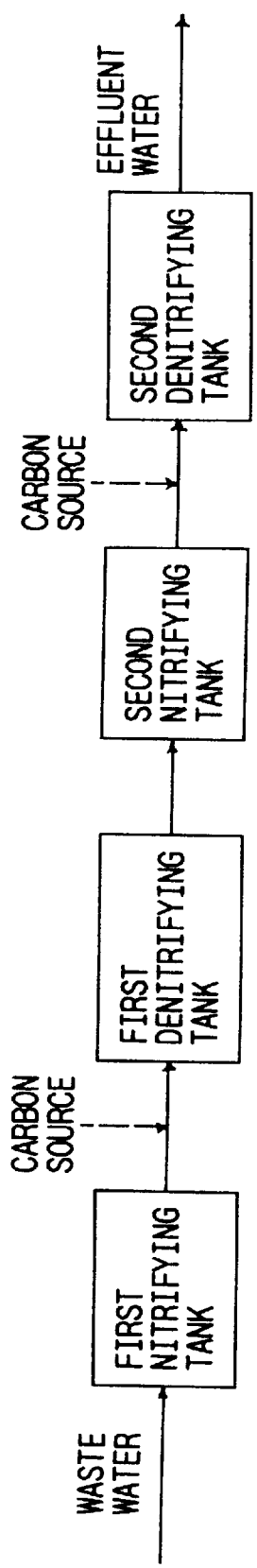
FIG. 11 is a block diagram, in which the system for biologically removing nitrogen according to the present invention consists of nitrifying, denitrifying, nitrifying and denitrifying.

FIG. 11 shows the case where the second denitrifying tank is further provided at the latter stage of the second nitrifying tank shown in the arrangement of FIG. 10, the nitrified liquid from the second nitrifying tank is not recycled through the first denitrifying tank, and the hydrogen donor source for the denitrifying bacteria is added at the former stage of the second denitrifying tank.

Figure 12:
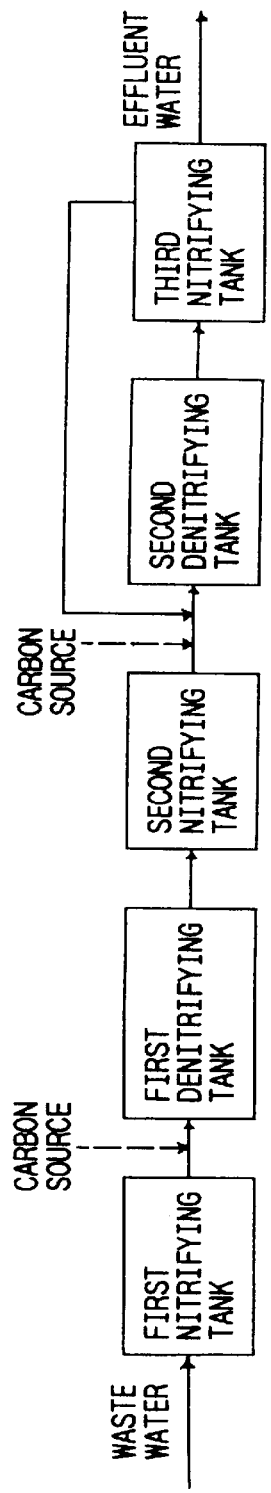
FIG. 12 is a block diagram, in which the system for biologically removing nitrogen according to the present invention consists of nitrifying, denitrifying, nitrifying, denitrifying and nitrifying.

FIG. 12 is the arrangement in the case where the third nitrifying tank is further provided at the latter stage of the second denitrifying tank in the arrangement shown in FIG. 11, and the nitrified liquid from the third nitrifying tank is recycled through the second denitrifying tank. In this arrangement, as fixed media, which are thrown into the nitrifying tank, in the case where the ammonium nitrogen concentration of the waste water is high, fixed media, in which AH bacteria grow preferentially, are thrown into he first nitrifying tank, and fixed media in which AH bacteria and AL bacteria grow prefentially, are thrown into the second nitrifying tank, and fixed media, in which AL bacteria grow preferentially, are thrown into the third nitrifying tank.

Figure 13:
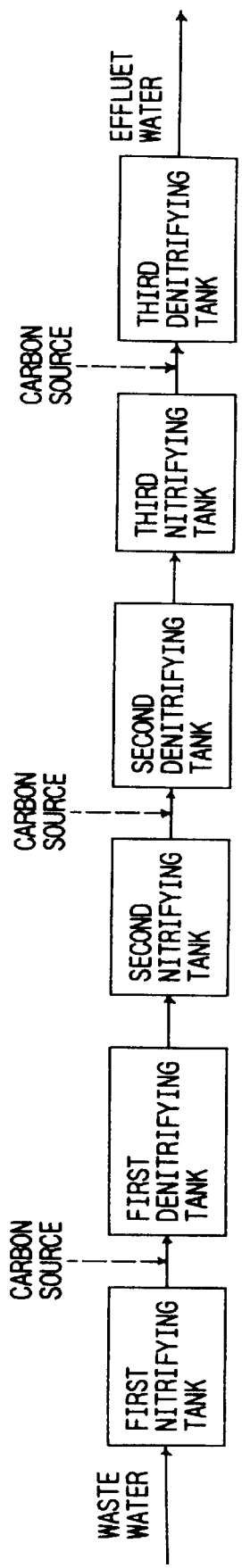
FIG. 13 is a block diagram, in which the system for biologically removing nitrogen according to the present invention consists of nitrifying, denitrifying, nitrifying, denitrifying, nitrifying and denitrifying.

FIG. 13 shows the case where the third denitrifying tank is further provided at the latter stage of the third nitrifying tank in the arrangement of FIG. 12, the nitrified liquid from the third nitrifying tank is not recycled through the second denitrifying tank, and the hydrogen donor source for the denitrifying bacteria is added at the former stage of the third denitrifying tank.

Figure 14:
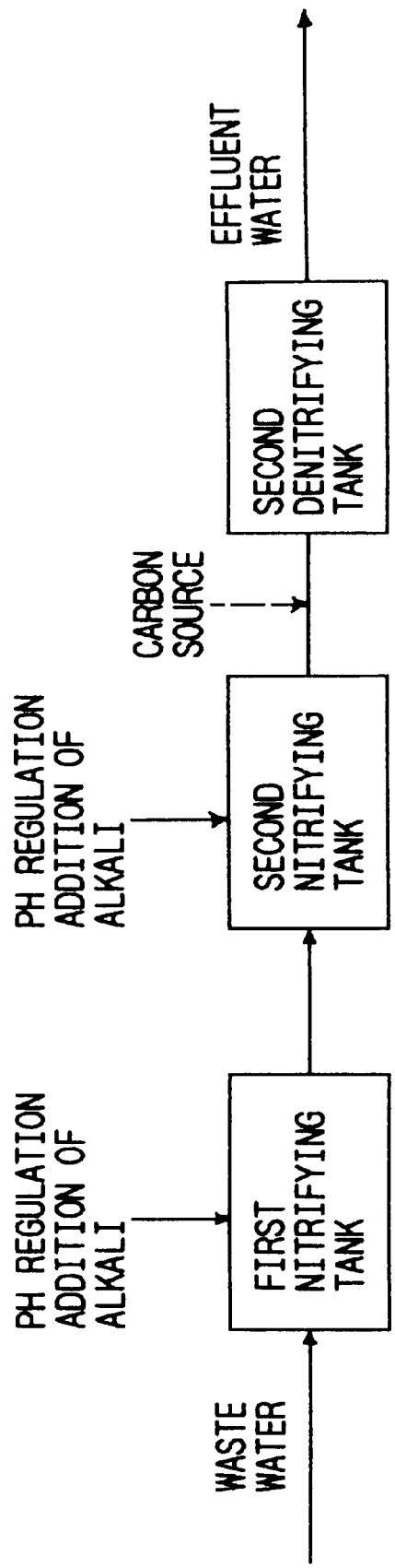
FIG. 14 is a block diagram, in which the system for biologically removing nitrogen consists of nitrifying, nitrifying and denitrifying.

FIG. 14 is a modification of FIG. 11 and shows the case where two nitrifying tanks for AH bacteria and for AH bacteria plus AL bacteria are provided in series and one denitrifying tank is provided at the latter stage of the two nitrifying tanks.

In the respective nitrifying tanks of the above-descried arrangement, in accordance with the concentration of the ammonium nitrogen which flows into the respective nitrifying tanks, the type of fixed media to be used (fixed media, in which AH bacteria grow preferentially, fixed media, in which AH bacteria and AL bacteria are mixed and fixed media, in which AL bacteria grow preferentially) can be determined.

In the above-described FIGS. 6 to 14, in the case where the ammonium nitrogen concentration is 400 mg/l or more, description has been given of the example where there is provided only the first nitrifying tank, into which fixed media, in which AH bacteria grow preferentially, are thrown.

Figure 15:
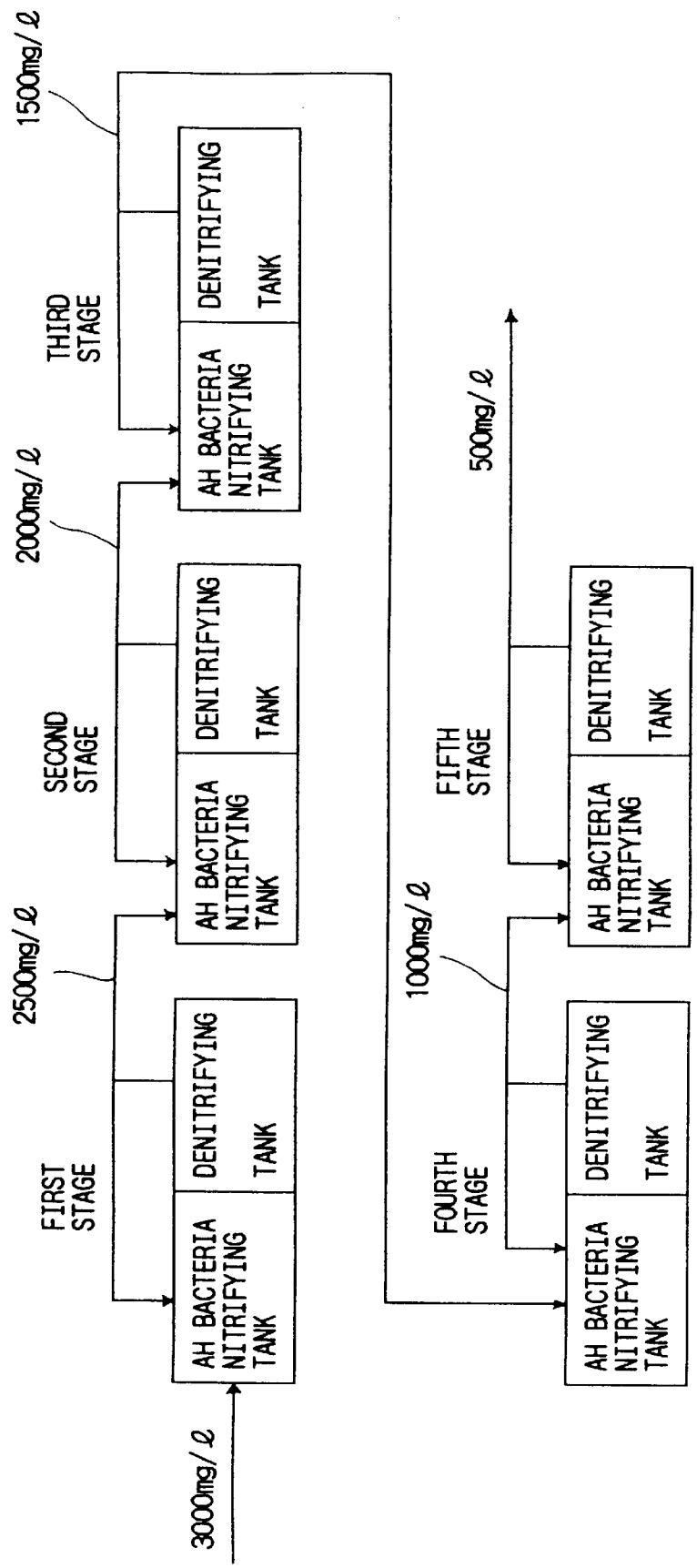
FIG. 15 is a block diagram, in which reaction tanks consisting of pairs of AH bacteria nitrifying tanks and denitrifying tanks are provided at a plurality of stages in series.

However, when the liquid containing the very high ammonium nitrogen concentration as in the first nitrifying tank is nitrified, nitrous acid and nitric acid are produced in large quantities, whereby the liquid in the first nitrifying tank is lowered in PH. The optimal range of PH of the nitrifying reaction is 7~8. When PH is lowered to 6, the speed of reaction is decreased to the half, and, when PH is less than 5.5, the reaction is stopped. Because of this, an alkali agent such as caustic soda should be added to raise PH. However, if the loading of addition of the alkali agent is increased, there occurs a problem of economics. Then, as shown in FIG. 15, the first nitrifying tank, into which the fixed media of AH bacteria are thrown, is divided into multi-stages, and the denitrifying tanks are clamped between the respective stages. That is, a denitrifying tank is provided at the latter stage of a nitrifying tank to form a single reaction tank, and the respective reaction tanks are provided at a plurality of stages in series. With this arrangement, in the state of PH of the liquid is raised by hydroxide ions produced by denitrifying reaction of nitrous acid ions and nitric acid ions, nitrifying reaction in the nitrifying tank at the following stage can be continued, so that the loading of addition of alkali agent can be decreased greatly. With this arrangement, economical operations can be carried out.

As described above, in the system for biologically removing nitrogen according to the present invention, by utilizing the characteristics of AH bacteria as being the nitrifying bacteria of nitrous acid type, which displays high activity at the high concentration and the characteristics of AL bacteria as being the nitrifying bacteria, which display high activity at the low concentration, operations capable of obtaining the maximum nitrifying speed in accordance with the ammonium nitrogen concentration during the nitrifying process and the nitrifying reaction of nitrous acid type for producing nitrous acid as being an intermediate oxide material of the ammonium nitrogen can be carried out. On the other hand, in the denitrifying process, the nitrified liquid high in the rate of nitrous acid is denitrified, whereby the nitrous acid reducing bacteria as being the denitrifying bacteria of the type of denitrifying nitrous acid grow preferentially, so that the denitrifying reaction for reducing nitrous acid into nitrogen gas can be efficiently carried out.

Description will hereunder be given of the detailed embodiments of the present invention, which are carried out by use of the system for biologically removing nitrogen having the arrangement of the nitrifying tanks and the denitrifying tanks as described above.

Embodiment 1

The embodiment 1 is an example, in which the waste water of ammonium nitrogen having the high concentration is processed in the order of nitrifying to denitrifying by use of the system for biologically removing nitrogen as shown in FIG. 9.

Standard activated sludge in a sewerage processing place is used as seed bacteria for being fixed. The fixing is carried out such that activated sludge 2 wt %, polyethylene glycol prepolymer 15 wt %, N, N, N', N'-tetramethyl ethylene diamin 0.5 wt % and potassium persulfate 0.25 wt % are mixed in the water and set up. Gel thus obtained is cut into mediums each having a square of 3 mm for use.

Fixed media each having the score of 3 mm (hereinafter referred to as "PEG gel media") are thrown into a nitrifying tank of 4 l, and the fill-up rate of PEG gel media is set at 10%. Under these conditions, the inorganic waste water containing the ammonium nitrogen concentration of 2000 mg/l is processed for the residence time of 20 hours in a nitrifying tank with daily load 2.4 kg-N/m$^3$·day (Load conversion per medium is 1000 mg-N/h·l-medium). Furthermore, the residence time in a denitrifying tank of 4 little is set at 20 hours and the ratio (C/N) between the amounts of carbon as being the hydrogen donor source added into the denitrifying tanks and the amount of the waste water nitrogen is set at 0.5 and the results after two months of the continuous operations are shown in Table 1. Incidentally, sponge of 40% is filled in the denitrifying tank as a filler material. However, any other filler material, fixed media or floating type bacteria may be used. Methanol was used as the added hydrogen donor source.

Similarly, No.2 of Table 1 shows the case where the packing rate of the PEG gel media is set at 20%. No.3 of Table 1 shows the results obtained in the case where the fixed media of connecting type "PVA media" are used and operations are performed under processing conditions similar to No.1 and No.2. The PVA media each have a spherical shape of 3 mmφ and has the surface connected to activated sludge. No.4 of Table 1 shows the results obtained in the case where sponge media of the connecting type are used and operations are performed under processing conditions similar to the previous case. The sponge media are of a cube of 5 mm and have the surface connected to the activated sludge. The load of ammonium nitrogen concentration per medium in these No.1~No.4 are set at 600 mg-N/h·l-medium or more.

A comparative example is obtained under the conditions, in which operations are performed by use of the activated sludge of floating type in both the nitrifying tank and denitrifying tank and the activated sludge is held at 4000 mg/l.

Table 1 shows the results of No.1~No.4 and the comparative example.

It is known from Table 1 that, in the case of the floating type activated sludge in the comparative example, the process was performed for two months, but the ammonium nitrogen concentration of the processed water was 1965 mg/l not able to process practically.

In contrast thereto, in the embodiments Nos.1 to 4 according to the present invention, the nitrifying speed is 215 mg-N/h·l-medium or more, particularly, in the case of the PEG gel media (packing rate 10%), the nitrifying speed is 560 mg-N/h·l-medium or more, a very high nitrifying speed is obtained, and nitrogen in the form of nitric acid out of the whole nitric oxide materials in the processed water is 10 mg/l or less, so that it is estimated that the nitrifying reaction of nitrous acid type governs.

As described above, the reason why the high nitrifying speed is obtained and the nitrifying reaction of nitrous acid type governs is deemed to reside in that the load of ammonium nitrogen per medium is set at 600 mg-N/h·l-medium or more, AH bacteria of nitrous acid type, which display high activity at the high ammonium nitrogen concentration grow to a high density. When the number of bacteria in the media of Nos.1 to 4 is practically measured, all of the media have high concentration where AH bacteria are $10^9 \sim 10^{10}$ cell/cm$^3$-medium. Furthermore, the reason why No.1~No.4 differ in nitrifying speed is deemed to reside in the differences in the types of media and the packing rates.

TABLE 1

| No. | Fixed Media | Effluent water (mg/l) NH$_4$—N | Effluent water (mg/l) NO$_3$—N | Nitrifying speed mg-N/h · l-medium |
|---|---|---|---|---|
| 1 | PEG gel media (Activated sludge entrapped in PEG gel) (10%) | 880 | <10 | 560 |
| 2 | PEG gel media (Activated sludge entrapped in PEG gel) (20%) | 410 | <10 | 398 |
| 3 | Connecting type PVA media (20%) | 825 | <10 | 294 |
| 4 | Connecting type sponge media (20%) | 1140 | <10 | 215 |
| 5 | Activated sludge (MLSS4000 mg/l) | 1965 | — | — |

In parentheses, packing rate of media and concentration of activated sludge are shown.

Embodiment 2

The embodiment 2 is an example, in which the waste water of ammonium nitrogen having the high concentration is processed through multiple stages in the order of nitrifying→denitrifying→nitrifying→denitrifying→nitrifying→denitrifying by use of the system for biologically removing nitrogen as shown in FIG. 13.

In the embodiment 2 also the activated sludge 2 wt % was used for forming fixed media similarly to the embodiment 1 and the fixed media were thrown into a first nitrifying tank, a second nitrifying tank and a third nitrifying tank. Furthermore, the denitrifying bacteria in the first, second and third denitrifying tanks are similar to those in the embodiment 1. Operating conditions were selected such that the ammonium nitrogen concentration of the waste water was 500 mg/l, in both the nitrifying tanks and the denitrifying tanks, the first tank contained 4 l, the second tank contained 4 l and the third tank contained 4 l, the total of the nitrifying tanks being 12 l, and the residence times in the portion of the nitrifying tanks were determined such that the first tank was 4 hours, the second tank was 4 hours and the third tank was 4 hours, the total of the residence times being 12 hours. The ratio (C/N) between the total of the amounts of carbon as being the hydrogen donor source added in the denitrifying tanks and the amount of nitrogen of the waste water was set at 0.9 and the continuous operations were performed for two months.

A comparative example was performed by the single stage process (one stage process was performed in the nitrifying tanks with the residence times being 12 hours).

The conditions and results in the respective nitrifying tanks in the multi-stage process are shown in Table 2.

TABLE 2

|  | First nitrifying tank | Second nitrifying tank | Third nitrifying tank |
|---|---|---|---|
| Residence time (h) | 4 | 4 | 4 |
| Packing rate of media (%) | 20 | 20 | 20 |
| Load (Kg-N/m$^3$ · d) | 3.00 | 1.20 | 0.43 |
| Load of media (mg-N/h · l-medium) | 625 | 250 | 90 |
| Nitrifying speed (mg-N/h · l-medium) | 375 | 160 | 88 |
| Effluent water $NH_4$—N (mg/l) | 200 | 72 | 2 |
| Effluent water $NO_3$—N (mg/l) | <10 | 20 | 25 |
| Effluent water $NO_2$—N (mg/l) | 280 | 95 | 50 |

From the results shown in Table 2, it was substantiated that, in the case of the embodiment 2, similarly to the embodiment 1, the load of the ammonium nitrogen per medium in the nitrifying tanks was set at 600 mg-N/h·l-medium or more, whereby the high nitrifying speed as high as 375 mg-N/h·l-medium was obtained. Furthermore, it was proved that, out of the whole nitric oxide materials, $NO_3$—N was less than 10 mg/l and $NO_2$—N was 280 mg/l, so that the nitrifying reaction of nitrous acid can govern. Although the results in the second nitrifying tank and the third nitrifying tank were not so much as in the first nitrifying tank, the nitrifying reaction governed. Furthermore, although it was not shown, it was found that in the finally processed water from the third denitrifying tank, $NH_4$—N was 3 mg/l or less, $NO_3$—N was 10 mg/l or less and $NO_2$—N was 3 mg/l or less, so that, in the denitrifying tanks, nitrous acid was efficiently reduced into nitrogen gas. From this, it was estimated that, by the nitrified liquid, in which nitrous acid had a high ratio, was denitrified in the denitrifying tank, so that the nitrous acid reducing bacteria as being the denitrifying bacteria for reducing nitrous acid grew preferentially.

On the other hand, in the comparative example, $NH_4$—N in the processed water was 240~280 mg/l and the process was not able to be performed.

Furthermore, there was examined an example, in which the multi-stage process was performed by the use of the system for biologically removing nitrogen as shown in FIG. 14 as a modification of the multi-stage process in the order of nitrifying→nitrifying→denitrifying. Although this example is different from the previous example in that two stage process of the nitrifying tanks plus one stage process of the denitrifying tank constitute the operating conditions and alkali is added to the respective nitrifying tanks, the other operating conditions are similar. The reason why alkali is added to the nitrifying tanks resides in that the liquid in the nitrifying tanks is inclined to acidic side due to nitric acid and nitrous acid produced by the nitrifying reaction, which is not desirable for the reaction of microorganisms. As the results, $NH_4$—N became 10 mg/l and less. However, there has been seen the tendency of increase of $NO_3$—N contained in the nitrified liquid from the nitrifying tanks. For this, in order to make $NO_3$—N in the finally processed water to be 10 mg/l or less, the ratio (C/N) between the total of the amounts of carbon as being the hydrogen donor source in the denitrifying tanks and the amount of nitrogen in the waste water was required to be a value as high as 2.0.

Embodiment 3

The embodiment 3 is an example, in which the waste water of ammonium nitrogen having the high concentration was processed in the multi-stage process by use of the system for biologically removing nitrogen as shown in FIG. 11 in the order of nitrifying→denitrifying→nitrifying→denitrifying. In the embodiment 3 also, the activated sludge 2 wt % was used for forming fixed media similarly to the embodiment 1 and the fixed media were thrown into the first nitrifying tank and the second nitrifying tank. Furthermore, the denitrifying bacteria in the first denitrifying tank and the second denitrifying tank were similar to those in the embodiment 1. Operating conditions were selected such that the ammonium nitrogen concentration of the waste water was 500 m/l in both the nitrifying tanks and the denitrifying tanks, the first tank contained 4 l and the second tank contained 9.5 l, the total being 13.5 l, and the residence times were determined such that the first tank was 4 hours and the second tank was 9.5 hours, the total of the residence times being 13.5 hours. The ratio (C/N) between the total of the amounts of carbon as being the hydrogen donor source added in the denitrifying tanks and the amount of nitrogen of the waste water was set at 1.25 and the continuous operations were performed for two months.

The conditions and the results of experiments in the respective nitrifying tanks in the multi-stage process in the embodiment 3 are shown in Table 3.

TABLE 3

|  | First nitrifying tank | Second nitrifying tank | Third nitrifying tank |
|---|---|---|---|
| Residence time (h) | 4 | 9.5 | — |
| Packing rate of media (%) | 20 | 20 | — |
| Load (Kg-N/m$^3$ · d) | 3.00 | 0.51 | — |
| Load of media (mg-N/h · l-medium) | 625 | 105 | — |
| Nitrifying speed (mg-N/h · l-medium) | 375 | 101 | — |
| Effluent water $NH_4$—N (mg/l) | 200 | 8 | <10 |
| Effluent water $NO_3$—N (mg/l) | <10 | 140 | <5 |
| Effluent water $NO_2$—N (mg/l) | 280 | 40 | <3 |

As the result, in the case of the multi-stage process in the embodiment 3, the load of the ammonium nitrogen per medium in the first nitrifying tank was set at 600 mg-N/h·l-medium or more, the processing at high speed was possible and the nitrous acid type governed in the nitrifying reaction in the first nitrifying tank. However, the rate of the nitrous acid in the second nitrifying tank was lowered and the rate of nitric acid was highered, so that the loading of addition of the amounts of the hydrogen donor source added to the denitrifying tanks were required to be high.

Embodiment 4

The embodiment 4 is an example, in which the waste water of ammonium nitrogen having the medium concentration is processed through multiple stages in the order of nitrifying→denitrifying→nitrifying→denitrifying by use of the system for biologically removing nitrogen as shown in FIG. 11. In the embodiment 4 also, the activated sludge 2 wt % was used for forming fixed media similarly to the embodiment 1 and the fixed media were thrown into the first nitrifying tank and the second nitrifying tank. Furthermore, the denitrifying bacteria in the first denitrifying tank and the second denitrifying tank were similar to those in the embodiment 1. Operating conditions were selected such that the ammonium nitrogen concentration of the waste water was 200 mg/l, in the nitrifying tanks, the first tank contained 4 l and the second tank contained 7 l, the total being 11 l, and the residence times were determined such that the first tank was 3 hours and the second tank was 7 hours, the total of the residence times being 10 hours. The ratio (C/N) between the total of the amounts of carbon as being the hydrogen donor source added in the denitrifying tanks and the amount of nitrogen of the waste water was set at 1.0 and the continuous operations were performed for two months. Table 4 shows the results of the experiments.

TABLE 4

|  | First nitrifying tank | Second nitrifying tank | Finally effluent water |
|---|---|---|---|
| Residence time (h) | 3 | 7 | — |
| Packing rate of media (%) | 10 | 20 | — |
| Load (Kg-N/m³ · d) | 1.60 | 0.43 | — |
| Load of media (mg-N/h · l-medium) | 670 | 89 | — |
| Nitrifying speed (mg-N/h · l-medium) | 250 | 88 | — |
| Effluent water $NH_4$—N (mg/l) | 125 | 2 | <5 |
| Effluent water $NO_3$—N (mg/l) | 20 | 110 | <5 |
| Effluent water $NO_2$—N (mg/l) | 50 | 15 | <3 |
| AH bacteria (cell/cm³-medium) | $4.3 \times 10^9$ | $8.5 \times 10^8$ | — |
| AL bacteria (cell/cm³-medium) | $4.2 \times 10^9$ | $3.6 \times 10^9$ | — |

From the results shown in Table 4, it was found that, in the embodiment 4 also, the load of the ammonium nitrogen per medium in the first nitrifying tank was set at 600 mg-N/h·l-medium, so that a high nitrifying speed was obtained, high speed process was possible and, as for the nitrifying reaction in the first nitrifying tank, the nitrous acid type governed. However, the rate of the nitrous acid in the nitrifying tank was decreased and the loading of addition of the hydrogen donor source was required to be increased. Furthermore, $NO_3$—N in the effluent water in the nitrifying tank reached 125 mg/l, AH bacteria and AL bacteria grew mixedly in the media, and the numbers of AH bacteria and AL bacteria were in the order of $10^9$ and substantially equal to each other. In the process of the waste water of ammonium nitrogen having the medium concentration, it is desirable to use fixed media, in which AH bacteria and AL bacteria are maintained at the numbers equal to each other.

Embodiment 5

The embodiment 5 is an example of a so-called method of fixing the nitrifying bacteria by separated culture, in which AH bacteria are separated from the activated sludge and fixed. AH bacteria purified from the standard activated sludge in a sewerage processing place as the seed bacteria for fixing. Fixing was performed such that AH bacteria 2 wt %, polyethylene glycol prepolymer 15 wt %, N, N, N', N' tetramethyl ethylene diamine 0.5 wt % and potassium persulfate 0.25% were mixed in the water and set up. Gel thus obtained is cut into mediums each having a square of 3 mm for use.

Fixed media of AH bacteria, each having a score of 3 mm (hereinafter referred to as "PEG-AH media") are thrown into a nitrifying tank of 4 l, and the fill-up rate of the PEG-AH media is set at 20%. At the latter stage of this nitrifying tank, a nitrifying tank and a settling tank according to the method of standard activated sludge were provided. Then, the inorganic waste water having a nitrogen concentration of 500 mg/l was processed for the residence time of 8 hours (4 hours in the nitrifying tank of the fixed media plus 4 hours in the nitrifying tank according to the method of standard activated sludge).

Furthermore, as a comparative example, a process only by the method of standard activated sludge (residence time is 8 hours) was performed. Table 5 shows the results.

TABLE 5

|  | Residence time (h) | Load (Kg-N/m³ · d) | Effluent water $NH_4$—N (mg/l) |
|---|---|---|---|
| This embodiment | 8 | 1.5 | less than 3 |
| Comparative example | 8 | 1.5 | 240–410 |

As apparent from Table 5, as the ammonium nitrogen concentration of the processed water in this embodiment, a value as low as 3 mg/l or less was obtained. In contrast thereto, the ammonium nitrogen concentration of the processed water in the comparative example was 280–410 mg/l, whereby the processing capacity was low. From this, it is found that the media which have fixed AH bacteria highly contribute to the nitrification of the ammoniac waste water having the high concentration.

Table 6 is one, in which the number of AH bacteria at the time of fixing is compared with the number of AH bacteria after the operations of one month in the above-described experiments.

TABLE 6

| Number of AH bacteria at the time of fixing (cell/cm³-medium) | Number of AH bacteria after one month (cell/cm³-medium) |
|---|---|
| $2.0 \times 10^3$ | $6.3 \times 10^9$ |
| $4.1 \times 10^4$ | $2.8 \times 10^{10}$ |
| $1.5 \times 10^5$ | $1.5 \times 10^{10}$ |
| $4.8 \times 10^6$ | $4.3 \times 10^{10}$ |

As apparent from Table 6, it is desirable to make the number of AH bacteria at the time of fixing to be $10^4$ cell/cm³-medium or more, whereby a high nitrating speed can be expected.

Embodiment 6

In the embodiment 5, AH bacteria obtained by purifying the activated sludge have been used. However, the embodiment 6 is an example, in which AH bacteria are enrichingly cultured from the activated sludge, which is a so-called method of fixing the nitrifying bacteria by the enrichment culture. The standard activated sludge collected in the sewerage processing place was batchingly cultured in a culturing liquid, in which the ammoniac concentration was 100, 200, 400, 500 and 1000 mg/l and the load was 0.5 kg-N/m³·d, and thus obtained sludge was entrapped and fixed by the method explained in the embodiment 4. After the sludge was entrapped in gel and fixed, the sludge was batchingly cultured for 20 days and the ratio between the numbers of AH bacteria and AL bacteria was measured. Table 7 shows the results.

TABLE 7

|  | Concentration of $NH_4$—N of waste water used in enrichment culture (mg/l) | Ratio of numbers of bacteria (AL bacteria/AH bacteria) |
|---|---|---|
| (1) | 100 | 100 |
| (2) | 200 | 1 |
| (3) | 400 | 0.8 |
| (4) | 500 | 0.2 |
| (5) | 1000 | 0 |

As apparent from Table 7, for the enrichment culture of AH bacteria, it is desirable to set the ammonium nitrogen concentration at 400 mg/l or more, preferably 500 mg/l or more. By the way, when the ammonium nitrogen concentration was 1000 mg/l, AH bacteria were enrichment cultured at 100%.

Embodiment 7

In the embodiment 7, experiments of processing were performed such that there were selected three types of entrapped and fixed media including entrapped and fixed media having only AL bacteria cultured by (1) in Table 7 of the embodiment 6, fixed media, in which AL bacteria and AH bacteria are cultured by (3), coexist, and entrapped and fixed media having only AH bacteria cultured by (5), and a nitrifying system consisting of three stages of nitrifying media, in which AL bacteria and AH bacteria coexist, were thrown into the second denitrifying tank, and the entrapped and fixed media having only AL bacteria were thrown into the third nitrifying tank. Operating conditions were selected such that the ammonium nitrogen concentration of the waste water was set at 1000 mg/l, in the nitrifying tanks, the first tank contained 4 l, the second tank contained 4 l and the third tank contained 4 l, the total being 12 l, and the residence times were determined such that the first tank was 5.3 hours, the second tank was 5.3 hours and the third tank was 5.3 hours, the total being 15.9 hours. Table 8 shows the results.

TABLE 8

|  | First nitrifying tank | Second nitrifying tank | Third nitrifying tank |
| --- | --- | --- | --- |
| Residence time (h) | 5.3 | 5.3 | 5.3 |
| Packing rate of media (%) | 20 | 20 | 20 |
| Load (Kg-N/m$^3$ · d) | 4.53 | 2.26 | 0.68 |
| Load of media (mg-N/h · l-medium) | 943 | 472 | 142 |
| Nitrifying speed (mg-N/h · l-medium) | 470 | 330 | 140 |
| Effluent water $NH_4$—N (mg/l) | 500 | 150 | less than 1 |

As apparent from Table 8, by performing three stage process (the total residence time of three tanks is 15.9 hours), it was able to carry out high speed process. That is, the ammonium nitrogen concentration of the processed water in the first tank was 500 mg/l, and the nitrifying speed at this time was a high value of 470 mg-N/h·l-medium. Then, the ammonium nitrogen of the processed water in the third tank was decreased to a satisfactorily low level of 1 mg/l or less.

Incidentally, in the embodiment 7, description has been given of the example, in which the fixed media having only AH bacteria, the fixed media, in which AH bacteria and AL bacteria grew mixedly, and the fixed media having only AL bacteria were processed in the three stages. These fixed media can be combined in any form, and the number of processing stages should not necessarily be limited to three stages. Furthermore, in the embodiment 6, the enrichment purified AL bacteria and AH bacteria have been used, but, purely separated AL bacteria and AH bacteria may be used. Furthermore, as gel used for fixing, there is no particular limit, and there may be used various polymeric materials such for example as polyacril amido, polyethylene glycol, polyvinyl alcohol, agar-agar, carrageenan and alginic acid.

Furthermore, in this embodiment, description has been given of a lateral type multi-stage process, in which the tanks are arranged in the lateral direction. However, a vertical type multi-stage process, in which the tanks are arranged in the vertical direction, may be adopted. Furthermore, AH bacteria and AL bacteria used for the method of biologically removing nitrogen according to the present invention may be made to grow in a practical equipment, or AH bacteria and AL bacteria which are cultured at the outside of the practical equipment may be added to the practical equipment.

Hereinabove, description has been given of the example, in which the ammonium nitrogen of the waste water having the high concentration was nitrified and denitrified as at the high concentration. However, description will hereunder be given of the case where the waste water of ammonium nitrogen in a sewerage, which has the low concentration is thickened, and thereafter, nitrified and denitrified.

Figure 16:
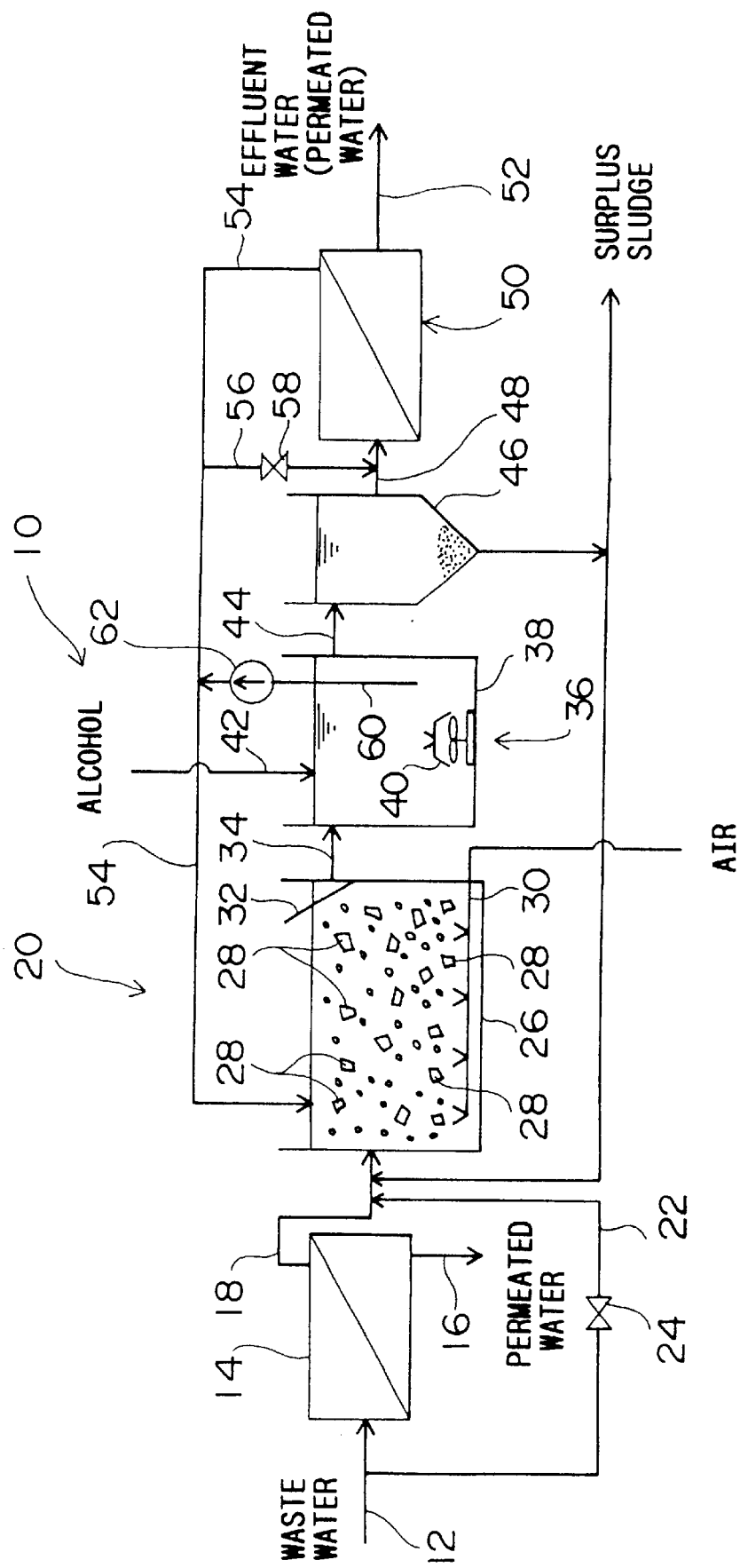
FIG. 16 is a block diagram for explaining a first from of the system for biologically removing nitrogen with a device for thickening the ammonium nitrogen according to the present invention.

FIG. 16 shows a first form of the system for biologically removing nitrogen, in which the waste water of ammonium nitrogen having the low concentration is thickened, and thereafter, nitrified and denitrified.

As shown in FIG. 16, afar the solid substance in the waste water is previously separated by the system for separating solid from liquid, not shown, the waste water of the ammonium nitrogen is caused to flow into a first device 14 for thickening ammonia through a waste water flow-in pipe 12 by use of a pressurizing pump, not shown. The first device 14 for thickening is formed of a device of reverse osmosis film (RO film), in which the thickened water, in which the ammonium nitrogen has a predetermined concentration, is separated through a film from permeated water containing almost no ammonium nitrogen. The permeated water is discharged as it is from a permeated water piping 16, and the thickened water is caused to flow into a nitrifying device 20 through a thickened water supply piping 18. Furthermore, a bypass piping 22 extending from the original water flow-in pipe 12 to the nitrifying device 20 without passing through the device 14 for thickening is provided, and an on-off valve 24 is provided in the bypass piping 22. With this arrangement, when there is no need for thickening the ammonium nitrogen concentration of the waste water to a satisfactorily high level, the waste water is caused to be flow into the nitrifying device 20 directly through the bypass piping 22.

The nitrating device 20 includes a nitrifying tank 26, fixed media 28 for fixing the nitrifying bacteria which are thrown into the nitrifying tank 26, an aeration piping 30 for supplying air into the nitrifying tank 26 to form the aerobic condition, and a screen 32 for preventing the fixed media 28 from flowing out of the nitrifying tank 26. As the fixed media 28 which are thrown into the nitrifying tank 26, to fixed media, in which AH bacteria grow preferentially or the fixed media, in which AH bacteria and AL bacteria grow mixedly, is used, whereby the nitrifying process of the thickened water is performed in the aerobic condition. The nitrified liquid which as been nitrified is caused to flow into a denitrifying device 36 through a nitrified liquid piping 34. Incidentally, PH, in which nitrifying bacteria work effectively, is desirable to be 7~8, and alkali may be added to the nitrifying device 20 by way of precaution against decrease of PH due to the nitric acid caused by the nitrifying process.

The denitrifying device 36 includes a denitrifying tank 38, a water agitating machine 40 and a hydrogen donor supply piping 42. In the denitrifying tank 38, the activated sludge containing the denitrifying bacteria float, the hydrogen donor source for the denitrifying bacteria such as alcohol is supplied by the hydrogen donor supply piping 42, and the denitrifying process for the nitrified liquid is performed. Thus denitrified liquid is caused to flow into a solid-liquid separating tank 46 through a denitrified liquid piping 44, and supernatant liquid which is solid-liquid separated is caused to flow into a second thickening device 50 through a supernatant liquid piping 48.

The second device 50 for thickening includes a precision filtering film (MF film) device and a reverse osmosis film (RO film) device consisting of a plurality of stages and having a three construction. The denitrifyed liquid caused to flow under pressure to the second device 50 for thickening is separated through a film into thickened water, in which the ammonium nitrogen remaining in the denitrified liquid is thickened, and permeated water not containing the ammonium nitrogen, and the permeated water is discharged from a processed water piping 52. On the other hand, the thickened water reaches the supernatant liquid piping 48 through a return piping 54 and a recycling piping 56 which is branched from the intermediate portion of the return piping 54, is recycled to the second device 50 for thickening to be thickened to attain a predetermined thickening magnification, and part of the recycled thickened water is returned to the nitrifying device 20 through the return piping 54. Flow control between the recycling quantity of the thickened water and the returning quantity returned to the nitrifying device 20 is performed by a flow rate regulating valve 58 provided in the recycling piping 56.

Furthermore, in order that the liquid in the denitrifying device 36 can be recycled to the nitrifying device 20 as necessary, a piping 60 for the recycling liquid is connected to the intermediate portion of the return piping 54 and a recycling pump 62 is provided in the piping 60 for the recycling liquid.

Description will hereunder be given of the action of a device 10 for processing the waste water constructed as described above according to the present invention by way of an example, in which the ammonium nitrogen waste water having the low concentration (about 80 mg/l) in the sewerage is processed.

The ammonium nitrogen waste water having the low concentration is firstly caused to flow into the first device 14 for thickening and separated through a film into thickened water, in which the ammonium nitrogen is thickened to a predetermined concentration, and permeated water almost not containing the ammonium nitrogen. The permeated water is discharged as it is and only the thickened water is caused to flow into the nitrifying device 20. With this arrangement, the thickened water reduced in amount in accordance with the thickening magnification is caused to flow from the first device 14 for thickening to the nitrifying device 20.

In the nitrifying device 20, the thickened water thickened in the first device 14 for thickening is brought into contact with the fixed media 28, in which the nitrifying bacteria are fixed, in the aerobic condition, whereby the nitrifying process is performed. As for the fixed media 28 for fixing the nitrifying bacteria, which are used for this nitrifying process, when the ammonium nitrogen concentration of the thickened water is 400 mg/l or more, the fixed media 28, in which AH bacteria grow preferentially, may be used, and, when the concentration at a level of about 150–400 mg/l, the fixed media 28, in which AH bacteria and AL bacteria grow mixedly, may be used. As described above, the ammonium nitrogen waste water is raised in concentration to the level of concentration suitable for the fixed media 28, in which AH bacteria grow preferentially or the fixed media 28, in which AH bacteria and AL bacteria grow mixedly, and the nitrifying process is performed, so that the number of bacteria in the fixed media 28 can be increased remarkably and a high nitrifying speed can be obtained. In this case, the higher the ammonium nitrogen concentration per medium is, the higher nitrifying speed can be obtained, so that it is desirable to raise the ammonium nitrogen load per medium within the limit where the ammonium nitrogen concentration of the processed water is not increased notably. To be concrete, a fill and residence time and the like of the fixed media to be thrown into the nitrifying tank 26 may be determined such that the ammonium nitrogen load becomes 500 mg-N/h·l-medium or more, preferably 600 mg-N/h·l-medium or more.

Subsequently, the nitrified liquid nitrated in the nitrifying device 20 is caused to flow into the denitrifying device 36, where the denitrifying process is carried out by the activated sludge containing the denitrifying bacteria, and discharged into condition as the nitrogen gas. The denitrified liquid denitrified in the denitrifying device 36 is solid-liquid separated in the solid-liquid separating tank 46, the supernatant liquid of the denitrified liquid is caused to flow into the second device 50 for thickening, and the ammonium nitrogen remaining in the denitrified liquid is removed. On the other hand, one part of activated sludge, which is settled at the bottom of the solid-liquid separation tank 46 is returned to the nitrifying device 20 and the other part of the activated sludge is extracted to the outside of the system as the surplus sludge.

Subsequently, the denitrified liquid caused to flow into the second device 50 for thickening is recycled and thickened such that a predetermined thickening magnification can be attained, so that the ammonium nitrogen can be separated through a film into thickened water, in which the ammonium nitrogen is thickened, and permeated water almost not containing the ammonium nitrogen. The thickened water is returned to the nitrifying device 20 and nitrified again. On the other hand, the permeated water is discharged as the processed water. With this arrangement, the ammonium nitrogen remaining in the denitrified liquid is removed nearly perfectly, so that the ammonium nitrogen concentration in the processed water can be decreased as much as possible.

As described above, by utilizing the characteristics of the fixed media 28, in which AH bacteria as being the nitrifying bacteria grow preferentially, or the fixed media 28, in which AH bacteria and AL bacteria grow mixedly, the waste water of the ammonium nitrogen having the low concentration can be thickened and nitrified, so that the quantity of water of the waste water processed in the nitrifying device 20 can be decreased greatly. Further, the high speed processing at the high nitrifying speed can be performed as compared with the conventional method of activated sludge, so that the device 10 for processing the waste water can be made compact in size greatly.

Figure 17:
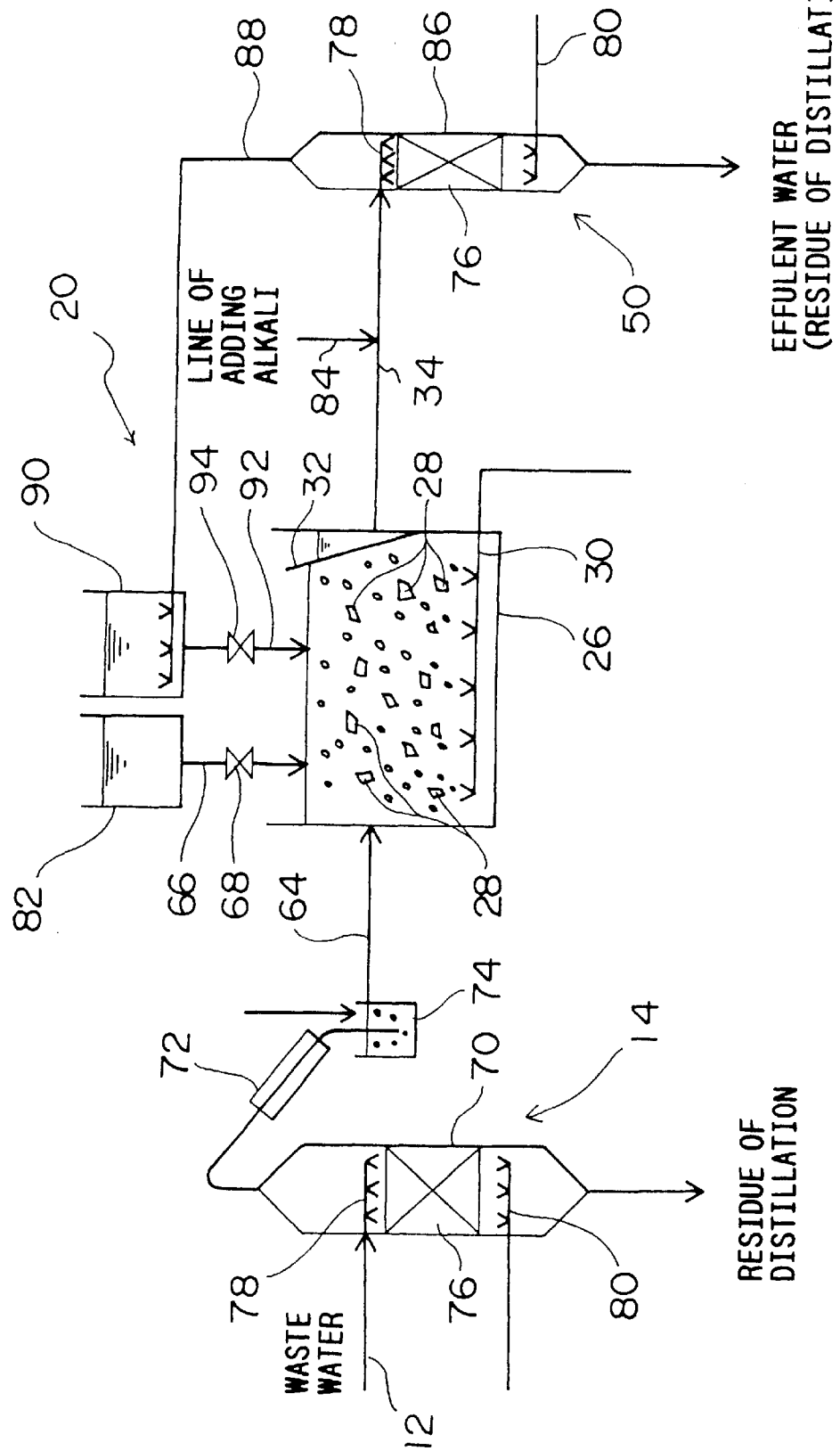
FIG. 17 is a block diagram for explaining a second from the system for biologically removing nitrogen with a device for thickening the ammonium nitrogen according to the present invention.

FIG. 17 shows an example of a second form of the system for biologically removing nitrogen, in which the waste water of the ammonium nitrogen having the low concentration is thickened, and thereafter, nitrified and denitrified. The first device 14 for thickening and the second device 50 for thickening are changed from the film separation type in the first form to a distillation separation type. FIG. 17 shows only a nitrifying system.

As shown in FIG. 17, in the waste water of the ammonium nitrogen, the solid substance in the waste water is previously separated by a solid-liquid separating device, not shown, and thereafter, the waste water is caused to flow into the first device 14 for thickening ammonia through the original water flow-in pipe 12. The first device 14 for thickening ammonia includes a distillation device 70, a condensation apparatus 72 and an absorbing tank 74, in which an absorbing liquid (for example, a weak acid such as acetic acid) is stored. In the middle stage position in the distillation device 70, a fill-up layer 76 filled with Rasching ring is formed, the waste water of the ammonium nitrogen is showered through a showering piping 78 provided upwardly of the fill-up layer 76, and heated air is supplied to the fill-up layer 76 through a heated air piping 80 provided downwardly of the fill-up layer 76. With this arrangement, the waste water of the ammonium nitrogen is separated through distillation into distilled water, in which the ammonium nitrogen is thickened, and residue of distillation almost not containing the ammonium nitrogen. The distilled liquid is distilled in the condensation thickening apparatus 72, absorbed into the absorbing liquid and the residue of distillation is discharged as it is.

The distilled water absorbed into the absorbing liquid is caused to flow into the nitrifying device 20 through the distilled water piping 64 and nitrified through contacting with the fixed media 28, in which AH bacteria grow preferentially, or the fixed media 28, in which AH bacteria and AL bacteria grow mixedly, in the aerobic condition. Furthermore, a storage tank 82 for alkali liquid (for example, weak acid such as sodium bicarbonate) for regulating PH in the nitrifying tank 26 to about 7~8 is provided upwardly of the nitrifying device 20, whereby alkali liquid of a predetermined value is added through an addition regulating valve 68 provided in an alkali liquid piping 66.

The nitrified liquid nitrified in the nitrifying device 20 is caused to flow into the second device 50 for thickening through the nitrified liquid piping 34, and alkali is added during this flow by an addition line 84, whereby PH is raised to about 10. The second device 50 for thickening is constituted by a distillation device 86, and the construction of the distillation device 86 is similar to that of the distillation device described in the first form. The nitrified liquid is distilled in the second device 50 for thickening and is separated through distillation into the distilled liquid, in which the ammonium nitrogen remaining in the nitrified liquid is thickened, and the residue of distillation into containing the ammonium nitrogen. The distilled liquid is caused to flow into a second absorbing tank 90, in which the absorbing liquid is stored through an ammonia separating piping 88 and returned to the nitrifying device 20 intermittently through an on-off valve 94 provided in an absorbing tank piping 92. On the other hand, the residue of distillation is discharged as the processed water.

In the case of the system for biologically removing nitrogen of the second from as constructed above, the same effect as in the first form can be obtained. Further, instead of the first and second devices 14 and 50 for thickening, the distillation devices 70 and 86 are used, so that the lowered processing capacity due to the jamming as in the film separation does not occur.

Furthermore, for PH regulation in the nitrifying tank, carbonate such as sodium hydrogencarbonate is used in general as described above. However, when the second device 50 for thickening is made to be the film separation type, it is essential to provide a solid-liquid separating tank. However, in the distillation type, it is not necessary to provide the solid-liquid separating tank, so that the device may be made compact in size.

Incidentally, in the above-described forms of operations, when a measurer for monitoring the ammonium nitrogen of the waste water is provided to determine the rate of thickening in the firs device for thickening on the basis of the result of measuring, more efficient nitrifying process can be carried out. Furthermore, there is no need for making the first and second devices for thickening to be identical with each other, and the film separation type and the distillation type may be combined freely.

Description will hereunder be given of an embodiment, in which the waste water of the ammonium nitrogen having the low concentration is nitrified and denitrified by use of the system for biologically removing nitrogen equipped with the above-described device for thickening.

Embodiment 8

The embodiment 8 shows the case of using the system for processing waste water as described in FIG. 16, in which the capacity of the nitrifying tank 26 is set at 5 l. Furthermore, as the fixed media 28, there is used a combining type PVA media, in which the nitrifying bacteria are attached to the surface of the media each having a 3 mm$\phi$ for culturing, with the packing rate being set at 20%.

Furthermore, operating conditions were selected by three types Nos. 1 to 3, and the residence time in the nitrifying tank 26 was changed so as to make the load of the ammonium nitrogen per medium reach 600 mg-N/·l-medium or more. Furthermore, the concentration of the ammonium nitrogen of the processed water, the rate of removal of ammonia (the rate of removal to the concentration of the ammonium nitrogen flowing into the nitrifying tank 26) and the nitrifying speed were measured at the time of stabilization after the continuous operation for 60 days.

According to the No.1 operating conditions, the waste water of the ammonium nitrogen having the ammonium nitrogen concentration of 80 mg/l was thickened by three times in the first device 14 for thickening, supplied to the nitrifying device 20, the second device 50 for thickening was operated to thicken the waste water by two times, and the residence time in the nitrifying device 26 was set to one hour.

According to the No.2 operating conditions, the waste water of the ammonium nitrogen having the ammonium nitrogen concentration of 400 mg/l was thickened by 1.5 times in the first device 14, supplied to the nitrifying device 20, and the second device 50 for thickening was operated to thicken the waste water by three times, and the residence time in the nitrifying tank was set to 5 hours.

According to the No.3 operating conditions, this is the case where the waste water of the ammonium nitrogen having the ammonium nitrogen concentration of a satisfactorily high value of 1000 mg/l. Without using the first device 14 for thickening, the waste water was supplied to the nitrifying device 20 through the bypass piping 22 as it was, only the second device 50 for thickening was operated to thicken the waste water by two times, and the residence time in the nitrifying device 26 was set to 6 hours.

As a comparative example, such a case was taken up that the waste water of the ammonium nitrogen having the ammonium nitrogen concentration of 80 mg/l was supplied to the nitrifying device 20 without being thickened, and only the second device for thickening was operated for thickening the waste water by two times.

FIG. 18 shows the results of above-described operating conditions and the results of the experiments.

As the result, the following are the results of measuring the ammonium nitrogen concentration of the respective effluent waters (the processed waters through the second device for thickening) in Nos. 1 to 3. In No.1, 4 mg/l (rate of removal . . . 98.3%) was attained, in No.2, 8~9 mg/l (rate of removal . . . 98.7%) was attained, and in No.3, 10 mg/l (rate of removal . . . 99.0%) was attained, so that satisfactory decreasing was attained. In contrast thereto, the ammonium nitrogen concentration of the processed water in the comparative example was 10 mg/l (rate of removal . . . 87.5%), so that the rate of removal was low as compared with Nos. 1 to 3.

Furthermore, all of the results of measuring the nitrifying speeds in Nos. 1 to 3 were 400 mg-N/h·l-medium or more, and No.3 showed a very high value of 460 mg-N/h·l-medium. In contrast thereto, the nitrifying speed in the comparative example was 120 mg-N/h·l-medium, which was about ¼ in the cases of Nos.1 to 3.

Furthermore, when the nitrifying bacteria contained in the media 28 after the completion of the examination were fixed, AH bacteria and AL bacteria were ascertained to be alive in Nos. 1 and 2 media 28, and it was also ascertained that, in the media 28 of No.3, AH bacteria grew preferentially. Furthermore, in the media 28 of the comparative example, most of the bacteria were AH bacteria, and it is deemed that the difference in type of bacteria had been reflected in the nitrifying speed.

Embodiment 9

The embodiment 9 shows the case of using the system for processing the waste water as described in FIG. 17. The capacity of the nitrifying tank 26, the fixed media 28 which were used, and the packing rate of the fixed media 28 are the same as those shown in the embodiment 1. Furthermore, in this embodiment, there was used the waste water of urine synthesized as the waste water of the ammonium nitrogen and diluted to the extent where the concentration of the ammonium nitrogen was 80 mg/l. Furthermore, the concentration of the ammonium nitrogen of the processed water and the nitrifying speed were measured at the time of stabilization after the continuous operations for 60 days.

Operating condition is in this embodiment were selected such that the waste water of the ammonium nitrogen having the concentration of the ammonium nitrogen of 80 mg/l was thickened by five times in the first device 14 for thickening, supplied to the nitrifying device 20, the second device 50 for thickening was operated to thicken the waste water by two times, and the residence time in the nitrifying device 26 was set to 4 hours.

As a comparative example, such a case was taken up that the waste water of the ammonium nitrogen having the ammonium nitrogen concentration of 80 mg/l was supplied to the nitrifying device 20 without being thickened, only the second device 50 for thickening was used to thicken the waste water by two times, and the residence time in the nitrifying device was set to 20 hours.

FIG. 19 shows the above-described operating conditions and the results of the experiments.

As the result, in the case of this embodiment, the ammonium nitrogen concentration of the residue of distillation discharged from the first device 14 for thickening was less than 5 mg/l. Furthermore, the ammonium nitrogen concentration of the processed water (residue of distillation) discharged from the second device 50 for thickening was stabilized at a value less than 10 mg/l. Furthermore, the nitrifying speed reached 290 mg-N/h·l-medium. Thus, the high nitrifying speed was attained in this embodiment and the processing at high speed was performed similarly to the embodiment 8.

On the other hand, in the case of the comparative example, the residence time in the nitrifying tank 26 was set at a value five times larger than that in this embodiment, whereby the ammonium nitrogen concentration of the processed water (residue of distillation) reached a value less than 10 mg/l. However, the nitrifying speed was decreased to a very low value of 14 mg-N/h·l-medium as compared with this embodiment, which is far off in result from the processing at high speed. It is deemed that the decrease in the nitrifying speed was caused by the decrease in the density of bacteria in accordance with the ammoniac concentration in the nitrifying tank 26.

As described above, in the method of biologically removing nitrogen and the system therefor according to the present invention, by utilizing the characteristics of AH bacteria as being the nitrifying bacteria of nitrous acid type for displaying high activity at the high concentration of the ammonium nitrogen and the characteristics of AL bacteria as being the nitrifying bacteria of nitrous acid type for displaying high activity at the low concentration of the ammonium nitrogen, in the nitrifying process, the operations capable of obtaining the maximum nitrifying speed in accordance with the ammonium nitrogen concentration can be performed and the nitrifying reaction of nitrous acid type for producing nitrous acid as being the intermediate oxide material of the ammonium nitrogen can be performed.

On the other hand, in the denitrifying process, the nitrified liquid, in which the rate of nitrous acid is high, is denitrified, whereby the nitrous acid reducing bacteria as being the denitrifying bacteria of the type of reducing nitrous acid grow preferentially, so that the denitrifying reaction for reducing nitrous acid into nitrogen gas can be performed efficiently.

With this arrangement, the waste water of the ammonium nitrogen having the high concentration can be processed at high speed without diluting it and nitrous acid as being the intermediate oxide material can be denitrified at the stage of nitrous acid, so that the period of time required for denitrifying process can be shortened. Accordingly, the system can be made compact in size even in the case of the waste water of the ammonium nitrogen having the high concentration, so that this system is particularly effective as the system for biologically processing in he places where the waste water of ammonium nitrogen having the high concentration on the level of 400 mg/l~5000 mg/l is produced in great quantity such for example as the developing laboratory, the inorganic matter synthesizing factory and the power plant.

Further, the waste water of the ammonium nitrogen having the low concentration can be thickened and processed, so that the quantity of processing of the waste water in the case, where the waste water of the ammonium nitrogen having the low concentration as in the sewerage is processed, can be decreased greatly. Accordingly, the system can be made compact in size.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A nitrifying method, wherein liquid containing ammonia is brought into contact with nitrifying bacteria in the aerobic condition to thereby nitrify ammonium nitrogen in the liquid containing ammonia, wherein:
in the nitrifying process, the liquid containing ammonia having an ammonium nitrogen concentration of 400 mg/l or more in the liquid is brought into contact with fixed media of floating type, in which AH bacteria as being the nitrifying bacteria grow preferentially; and the load of the ammonium nitrogen per fixed medium of floating type is 500 mg-N/h·l-medium or more so as to perform the nitrifying reaction of nitrous acid, in which a generation rate of the nitrous acid is 80% or more in all nitrogen oxide which is generated by nitrifying the ammonium nitrogen in the liquid containing ammonia.

2. A nitrifying method, wherein liquid containing ammonia is brought into contact with nitrifying bacteria in the aerobic condition to thereby nitrify ammonium nitrogen in the liquid containing ammonia, wherein:
the nitrifying process is divided into a plurality of stages, whereby the liquid containing ammonia is successively processed, in the respective stages, the liquid having the concentration of ammonium nitrogen 400 mg/l or more in the liquid is brought into contact with the fixed media of floating type, in which AH bacteria as being nitrifying bacteria grow preferentially; and the load of the ammonium nitrogen per fixed medium of floating type is 500 mg-N/h·l-medium or more so as to perform the nitrifying reaction of nitrous acid, in which a generation rate of the nitrous acid is 80% or more in all nitrogen oxide which is generated by nitrifying the ammonium nitrogen in the liquid containing ammonia.

* * * * *